(12) United States Patent
Kittleson et al.

(10) Patent No.: US 12,256,769 B2
(45) Date of Patent: Mar. 25, 2025

(54) RETORTABLE GLUTEN-FREE PASTA

(71) Applicant: General Mills, Inc., Minneapolis, MN (US)

(72) Inventors: Diana Lee Kittleson, Golden Valley, MN (US); Christine S. T. Ng, Golden Valley, MN (US); Steven C. Robie, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 213 days.

(21) Appl. No.: 16/480,934

(22) PCT Filed: Jan. 27, 2017

(86) PCT No.: PCT/US2017/015326
§ 371 (c)(1),
(2) Date: Jul. 25, 2019

(87) PCT Pub. No.: WO2018/140031
PCT Pub. Date: Aug. 2, 2018

(65) Prior Publication Data
US 2019/0387774 A1    Dec. 26, 2019

(51) Int. Cl.
*A23L 7/113* (2016.01)
*A23L 3/10* (2006.01)
(Continued)

(52) U.S. Cl.
CPC ............ *A23L 7/113* (2016.08); *A23L 3/10* (2013.01); *A23L 11/05* (2016.08); *A23L 23/00* (2016.08); *A23P 30/20* (2016.08); *A23V 2002/00* (2013.01)

(58) Field of Classification Search
None
See application file for complete search history.

(56) References Cited

U.S. PATENT DOCUMENTS

| 4,466,985 A | 8/1984 | Tsen et al. |
| 4,597,976 A | 7/1986 | Doster et al. |

(Continued)

FOREIGN PATENT DOCUMENTS

WO    2015084742 A2    6/2015

OTHER PUBLICATIONS

International Search Report and Written Opinion of the ISA/US dated May 4, 2017 in PCT/US2017/015326 (WO/2018/140031A1), 10 pgs.

(Continued)

*Primary Examiner* — Lien T Tran
(74) *Attorney, Agent, or Firm* — Tina Yin Sowatzke

(57) ABSTRACT

A gluten-free pasta product that survives retort may be formed by preparing a dough mixture with gluten-free flour and water. The dough can be extruded at a temperature and with an amount of mechanical energy effective to form an extruded pasta product having a bi-continuous matrix of protein and starch. The extruded pasta product can be incorporated into a closed retort container and subsequently retorted. The resulting retorted food product may contain gluten-free pasta that has the structural integrity and textual firmness consistent with that exhibited by traditional wheat pasta after having undergone retort despite the absence of binding gluten molecules.

17 Claims, 10 Drawing Sheets

(51) Int. Cl.
　　　　*A23L 11/00*　　　　(2021.01)
　　　　*A23L 23/00*　　　　(2016.01)
　　　　*A23P 30/20*　　　　(2016.01)

(56)　　　　References Cited

U.S. PATENT DOCUMENTS

| | | | |
|---|---|---|---|
| 5,456,934 | A | 10/1995 | Lee et al. |
| 5,759,607 | A * | 6/1998 | Chawan ................ A23L 29/256 |
| | | | 426/451 |
| 5,989,620 | A * | 11/1999 | Wang ...................... A23L 11/05 |
| | | | 426/443 |
| 6,083,551 | A | 7/2000 | Sowbhagya et al. |
| 2002/0146485 | A1* | 10/2002 | Oh .......................... A23L 7/109 |
| | | | 426/57 |
| 2005/0112261 | A1 | 5/2005 | Davis |
| 2007/0190216 | A1 | 8/2007 | Seiler |
| 2010/0151078 | A1 | 6/2010 | Seiler |
| 2015/0150288 | A1* | 6/2015 | Tutuncu ................. A23L 7/109 |
| | | | 426/557 |
| 2017/0273339 | A1 | 9/2017 | Vlatis |
| 2017/0347671 | A1 | 12/2017 | Domingues et al. |

OTHER PUBLICATIONS

Rumpold et al., "Nutritional Composition and Safety Aspects of Edible Insects," Mol. Nutr. Food Res., 57(5):802-823, May 2013.

* cited by examiner

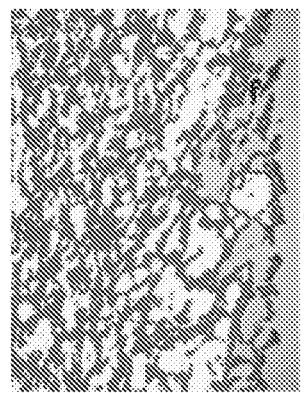
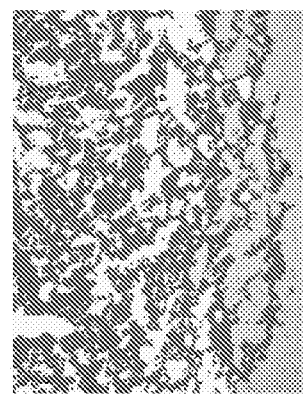
FIG. 9I
FIG. 9L
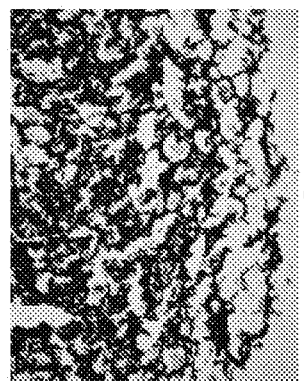
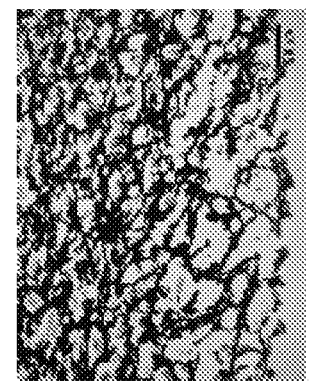
FIG. 9H
FIG. 9K
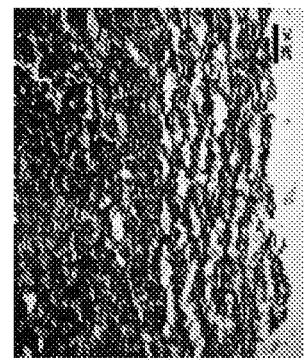
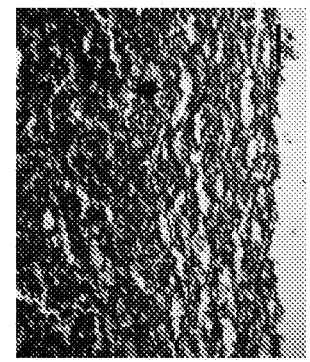
FIG. 9G
FIG. 9J

RETORTABLE GLUTEN-FREE PASTA

CROSS-REFERENCE

This application is a 35 U.S.C. 371 national phase filing from International Application No. PCT/US2017/015326, filed Jan. 27, 2017, the entire contents of which are incorporated herein by reference.

TECHNICAL FIELD

This disclosure relates to food products and, more particularly, to retorted and retortable food products.

BACKGROUND

A variety of pre-cooked, shelf-stable foods are commercially available for consumer purchase and consumption. These food products are often made shelf stable by retorting the product during production, thereby sterilizing the product for longer shelf life. Generally, retorted food products are prepared by packing the ingredient items in a retort container and then thermally processing the container. The ingredients may be precooked prior to being added to the container or may cooked in the container during the process of retorting. In either case, the container can be sealed and thermally processed using a retort sterilization process. Retort sterilization typically involves heating the retort container and food ingredients contained in the container at a high temperature for a period of time sufficient to achieve commercial sterility of the food product. The process often occurs at high pressure and high temperature in a retort vessel during commercial production.

A large variety of retorted food products include flour-based ingredients such a pasta and noodles. For example, soups, pastas, and other noodle-containing products are typical commercially available retorted food products. Traditionally, pasta included in retorted food products is made of wheat. Wheat contains the protein complex gluten, which helps hold the pasta structure together and survive the high temperature and pressure conditions of retort. While wheat-based pasta in retorted products continues to find widespread applicability, certain consumer groups focus on purchasing product free of wheat and gluten. For example, individuals that have a wheat allergy or gluten autoimmune disorder caused by Celiac disease need to avoid wheat or gluten in their diet to prevent adverse health effects. Traditional gluten-free alternatives to wheat-based pasta cannot survive the harsh conditions of retort.

SUMMARY

In general, this disclosure is directed to techniques for producing gluten-free pasta products, the gluten-free pasta products so produced, and consumable products incorporating the gluten-free pasta products. The gluten-free pasta products may have sufficient structural integrity to survive retort conditions without disintegrating or structurally decomposing. As a result, the gluten-free pasta can be incorporated into a retort container and retorted with other ingredients to provide a shelf-stable retorted product. When the other ingredients added to the container are also gluten-free, the entire retorted product be characterized and labeled as being a gluten-free product.

To produce a gluten-free pasta that survives retort, appropriate constituent gluten-free ingredients may be selected and processed in such a way as to produce a resulting product that survives retort while also providing textual firmness desired by consumers. Different factors that may influence the quality and efficacy of the gluten-free pasta include the characteristics of the gluten-free flour used to produce the pasta, the processing conditions under which the gluten-free flour is transformed into an extruded pasta, and the resulting structural characteristics of the extruded pasta so produced.

Without wishing to be bound by any particular theory, some examples of a gluten-free pasta according to the disclosure are believed to exhibit enhanced retort survivability by having a bi-continuous matrix of protein and starch that forms the structure of the pasta. The bi-continuous matrix of protein and starch may be characterized by having continuous and semi-continuous phases of interconnected starch molecules dispersed among continuous and semi-continuous phases of interconnected protein molecules. Accordingly, instead of being formed primarily of discrete particles of intermixed protein and starch, the pasta may instead have a networked structure formed of interwoven strands of protein and starch. The mechanical strength of this structure can provide a pasta product that survives retort while still exhibiting sufficient textual firmness even without having gluten protein to act as a binder and rigidity agent.

To form a gluten-free pasta product that survives retort, a gluten-free flour may be selected as a starting ingredient. The gluten-free flour may contain an effective amount of ungelatinized starch and/or protein other than gluten protein to form the resulting gluten-free pasta product. Additionally or alternatively, the gluten-free flour may contain appropriate levels of amino acids that form peptides having a melt point above the retort temperature the subsequently formed retortable product is exposed to.

In either case, the gluten-free flour may be processed, for example with water, in an extruder with an amount of mechanical mixing energy and thermal energy effective to form a pasta product having retort survivability characteristics. For example, the gluten-free flour may be processed in an extruder with an amount of mechanical mixing energy and/or thermal energy to effectively form an extruded pasta product having a wall structure of with a bi-continuous matrix of protein and starch. Additionally or alternatively, the extruded pasta product may have an external wall surface defined by a layer of gelatinized starch substantially devoid of pores, which may prevent starch and protein within the body of the wall structure from passing through the gelatinized starch layer during retort. Extruded pasta dough may alternatively be sheeted or formed into geometries that cannot be created using an extruder die head. Independent of the specific internal dough structure of the extruded pasta, the pasta may be used immediately or dried or frozen prior to being incorporated into a retort container and subject to retort conditions. The resulting retorted pasta product may contain gluten-free pasta that survived retort without substantially disintegrating or decomposing and the have a texture comparable to conventional wheat pasta.

In one example, a process for preparing a retorted product is described. The process includes preparing a dough mixture by admixing a gluten-free flour with water to form an extrudable pasta dough and extruding the extrudable pasta dough at a temperature and with an amount of mechanical energy effective to form an extruded pasta product having a bi-continuous matrix of protein and starch. The method further involves incorporating the extruded pasta product into a closed container and retorting the extruded pasta product in the closed container, thereby producing a product containing retorted pasta.

In another example, a retorted food product is described that includes a container having undergone retort that contains a gluten-free retorted pasta having a bi-continuous matrix of protein and starch. The gluten-free retorted pasta may exhibit a textural firmness of at least 5000 grams. Further, the gluten-free retorted pasta may be bounded by a wall of starch formed about an external perimeter of the gluten-free retorted pasta.

The details of one or more examples are set forth in the accompanying drawings and the description below. Other features, objects, and advantages will be apparent from the description and drawings, and from the claims.

BRIEF DESCRIPTION OF DRAWINGS

FIGS. 9A-9L are images of different pasta samples analyzed for edge continuity.

DETAILED DESCRIPTION

Figure 1:
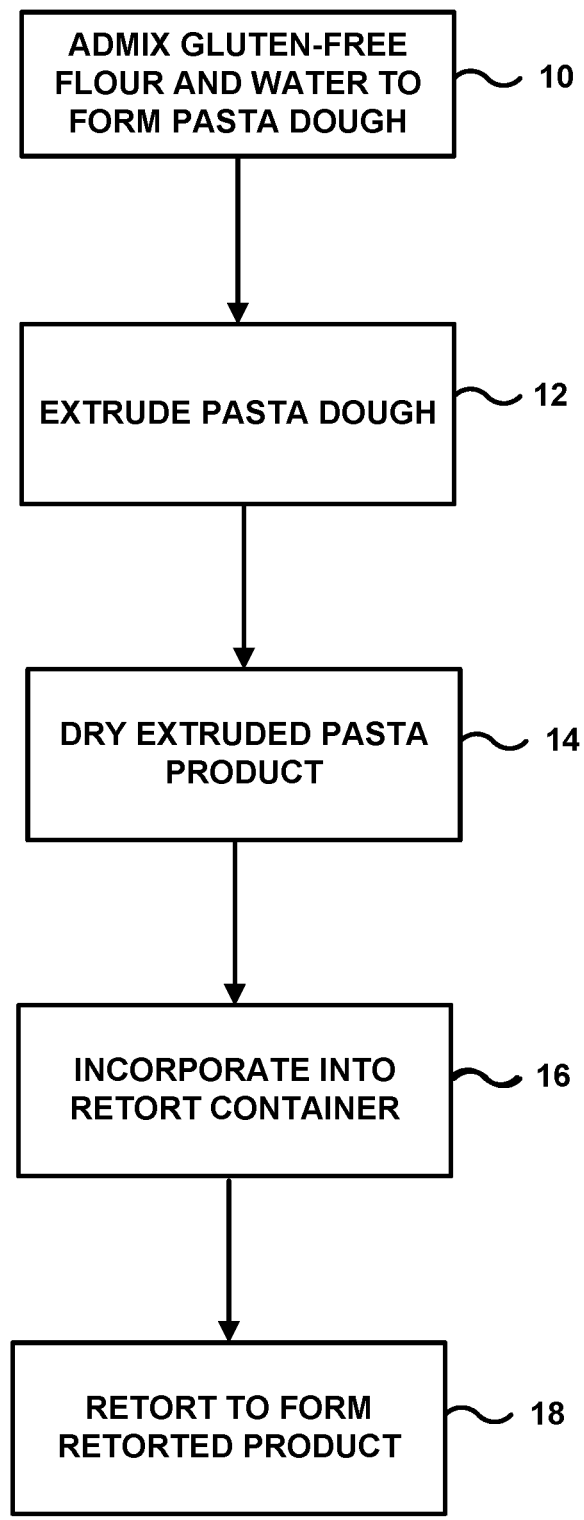
FIG. 1 is a flow diagram illustrating an example process for forming a retortable gluten-free pasta product.

In general, this disclosure is directed to retortable gluten-free pasta products and techniques for producing retortable and retorted gluten-free pasta products. In some examples, the gluten-free pasta product is formed by admixing a gluten-free flour with water to form an extrudable pasta dough. The gluten-free flour may contain minimum amounts of native protein and/or ungelatinized starch suitable to form a resulting retort-stable gluten-free pasta product. In some examples, the gluten-free flour may have specific ratios of certain amino acids that form high melt temperature peptides, such as glutamic acid, cystine, and/or proline. In either case, the extrudable pasta dough formed from the gluten-free flour may be extruded at a temperature and with an amount of mechanical energy effective to form an extruded pasta product having a bi-continuous matrix of protein and starch.

The mechanical mixing energy and/or thermal energy imparted to the extrudable pasta dough during extrusion may be effective to disaggregate intermixed particles of starch and protein, forming continuous matrices of starch interwoven with protein. During extrusion, the protein may be denatured and/or the ungelatinized starch may be gelatinized to form the matrix of protein and starch. In some examples, the mechanical mixing energy and/or thermal energy imparted to the extrudable pasta dough may form pasta pieces having external wall surfaces of gelatinized starch. In either case, the resulting extruded gluten-free pasta product may exhibit physical/structural stability when exposed to retort conditions. For this reason, the extruded gluten-free pasta product may be usefully incorporated into a retort container with other ingredients and then closed and exposed to retort conditions. The resulting retorted product may be shelf stable and have gluten-free pasta pieces having an appearance and firmness consistent with that provided by traditional retorted wheat pasta.

As used herein, the following terms have the following definitions:

"Gluten-Free" means a gluten content less than 5 weight percent.

"Bi-Continuous Matrix of Protein and Starch" means a network of protein and gelatinized starch where the gelatinized starch is at least 90% continuous and intertwined with a protein network having at least 20% dispersivity, and no more than 10 volume percent non-networked, agglomerated protein, with no single protein agglomerate having a length greater than 345 microns.

"Percent Dispersivity" means the percentage of stereology grid intercepts overlaying a 1360×1024 pixel image that intersect with protein staining on the image, where the stereology grid is 21×15, has intercepts 1.5 square microns in area, and adjacent intercepts are separated by 40 microns center-to-center.

"Substantially Closed Boundary" means having a cumulative porosity of less than 2% and no individual pores greater than 30 microns per 1040 micron length sample.

"Glutamic Acid in Wheat Flour" means 4.865 dry weight percent glutamic acid.

"Cystine in Wheat Flour" means 0.343 dry weight percent cystine.

"Proline in Wheat Flour" means 1.656 dry weight percent proline.

"Textual Firmness" means texture measured by a TA.XT Plus Texture Analyzer commercially available from Texture Technologies Corp. and Stable Micro Systems, Ltd operating in compression mode with a trigger distance of 135 mm, a test speed of 5 mm/second, and a contact force of 5 g.

FIG. 1 is a flow diagram illustrating an example process for forming a retortable gluten-free pasta product. The process includes admixing a gluten-free flour and water with optional additional ingredients to form an extrudable pasta dough (10) and extruding the pasta dough at a temperature and with an amount of mechanical energy effective to form an extruded pasta product that survives subsequent retorting (12). After forming the extruded pasta product, the extruded pasta product may be dried (14) and incorporated into a container suitable for retort (16). The container containing the extruded gluten-free pasta product can then be subject to a retort process to produce a retorted pasta product (18).

To make a gluten-free pasta dough that can be extruded to form a gluten-free extruded pasta product, flour is blended with water and other ingredients. Manipulating the type, quality, and quantity of gluten-free flour in the pasta dough along with subsequent extrusion characteristics may control the retort survivability characteristics of the resulting pasta product. To manufacture an extrudable pasta dough in the example technique of FIG. 1, a gluten-free flour is admixed with water to form the dough (10). The gluten-free flour may be substantially devoid of gluten as defined herein. Gluten is a protein complex that can be found in the Triticeae tribe of grains, which includes wheat, barley and rye. The gluten content in flour may provide organoleptic properties, such as texture and taste, to a pasta product formed of such a flour. The gluten-free flour lacks these gluten protein molecules and the resulting structural characteristics provided by the gluten molecules. As noted above, the term "Gluten-Free" means having a gluten content less than 5 weight percent. In some examples, a gluten-free product or ingredient has a gluten content less than 3 weight percent, such as less than 1 weight percent, or approximately 0 weight percent.

To overcome the lack of gluten molecules, the gluten-free flour may include certain amounts of non-gluten proteins and/or starch which, upon being extruded, form a structural framework that allow the resulting pasta product to survive retort. In some examples, the pasta dough is manufactured using a gluten-free flour that has at least 15 weight percent protein, such as at least 18 weight percent protein, at least 20 weight percent protein, or at least 25 weight percent protein. For example, the protein content of the gluten-free flour may range from 15 weight percent protein to 35 weight percent protein, such as from 18 weight percent protein to 25 weight percent protein. The protein content of the gluten-free flour may be measured on a dry weight basis before incorporating the flour to form the pasta dough. Further, the protein content of the flour may be based on the total weight of all proteins in the gluten-free flour, where the proteins are generally considered to include any complex organic macromolecule that is composed of one or more chains of amino acids.

In some examples, the protein in the gluten-free flour is a native, unprocessed protein. In general, native, unprocessed proteins may be considered as those proteins that have not been denatured. During denaturation, proteins may lose the quaternary structure, tertiary structure and secondary structure that is present in their native state. Accordingly, a denatured protein may have characteristics or properties that have been altered such as by heat, enzyme action, or chemicals that cause the protein to lose some of its biologic activity. By utilizing a native, unprocessed protein, the protein molecules in the gluten-free flour may solubilize and aggregate and/or react and bind during subsequent extrusion to form a networked protein matrix structure that may not otherwise form if using a denatured protein.

In addition to containing protein other than gluten, the gluten-free flour will typically include starch. In general, starch is a polymer formed of linked anhydro-a-D-glucose units. It may have either a mainly linear structure (amylose) or a branched structure (amylopectin). The molecular weight of the constituent polymers, particularly amylose, varies between different starch sources. In native, uncooked and ungelatinized form, the starch molecules amylose and amylopectin are located within starch granules that are insoluble in cold water. Flour, independent of the source and protein content, typically includes ungelatinized starch, such as uncooked, ungelatinized starch. The ungelatinized starch may have a semi-crystalline structure. By contrast, when the starch is cooked to provide cooked, pregelatinized starch, the starch granules can swell, burst, and lose their semi-crystalline structure.

The gluten-free flour used to make the pasta dough according to the technique of FIG. 1 may have an amount of ungelatinized starch effective to form a pasta product that survives retort. The specific amount of ungelatinized starch may vary based on factors such as the amount of protein present in the gluten-free flour and the configuration and operating characteristics of the extrusion equipment used to extrude the pasta dough. In some examples, the amount of ungelatinized starch in the gluten-free flour may be greater than 50 weight percent, such as greater than 60 weight percent, or greater than 70 weight percent. For example, the amount of ungelatinized starch in the gluten-free flour may range from 60 weight percent to 80 weight percent. The amount of ungelatinized starch in the gluten-free flour may be measured on a dry weight basis before incorporating the flour into the pasta dough.

In some examples, the gluten-free flour used to form the pasta dough does not contain pre-gelatinized starch. In other examples, however, the pasta dough may be formed using a gluten-free flour containing pre-gelatinized starch. Due to the presence of partially gelatinized starch when using flour containing pre-gelatinized starch, the extrusion conditions used to process the dough may be adjusted to achieve a final degree of starch gelatinization effective to form a bi-continuous matrix of protein and starch.

As discussed in greater detail below, the protein and the ungelatinized starch in the gluten-free flour may react during extrusion to form a network that includes continuous and semi-continuous strands of protein interleaved with continuous and semi-continuous strands of starch. This resulting bi-continuous matrix structure may help impart characteristics of both retort survivability as well as textual firmness for the resulting retorted pasta product. Accordingly, in some examples, the gluten-free flour may be selected to provide controlled amounts of both protein (e.g., native, unprocessed protein) and starch (e.g., ungelatinized starch). In one example, the gluten-free flour has at least 18 weight percent protein and at least 50 weight percent ungelatinized starch, such as at least 25 weight percent protein and at least 70 weight percent ungelatinized starch. For example, a ratio of the weight of protein divided by the weight of starch present in the gluten-free flour may be at least 0.36, such as from 0.36 to 0.5.

In some examples, the gluten-free flour may be selected to have specific amounts of one or more amino acids. While not wishing to be bound by any particular theory, it is believed that selecting the gluten-free flour to contain suitable amounts of one or more amino acids that form high melt temperature peptides (e.g., melt temperatures above the temperature the pasta product is exposed to during retort) may help the resulting pasta product survive retort. The one or more amino acids may react to help form the continuous and semi-continuous strands of protein that help the resulting pasta product survive retort. If the pasta dough used to manufacture the extruded pasta product does not contain a suitable amount of the high temperature-stable amino acids, it is believed that the pasta product may, under certain conditions, not adequately survive retort. Selecting the gluten-free flour to be one that contains an appropriate amount of the one or more amino acids may help the gluten-free pasta product survive retort.

Amino acids that may enhance the retort survivability of the gluten-free product if present in a sufficient amount can include glutamic acid and/or cystine and/or proline. These amino acids may form high melt temperature peptides that provide structural support for the extruded gluten-free pasta product to help the product survive retort. Recognizing that traditional pasta formed of wheat survives retort, the amount of one or more specific amino acids present in the gluten-free pasta may be measured relative to the amount of that amino acid found in wheat flour. In some examples, the gluten-free flour is selected so a ratio of an amount of glutamic acid in the gluten-free flour to an amount of glutamic acid in wheat flour is greater than 0.75, such as at least 0.8. Additionally or alternatively, the gluten-free flour may be selected so a ratio of an amount of cystine in the gluten-free flour to an amount of cystine in wheat flour is greater than 0.85, such as at least 0.9. Further additionally or alternatively, the gluten-free flour may be selected so a ratio of an amount of proline in the gluten-free flour to an amount of proline in wheat flour is greater than 0.5, such as greater than 1.0. In each case, the ratio may be determined by dividing the mass of the amino acid in the gluten-free flour by the corresponding mass of the amino acid in wheat flour, as defined herein.

Example types of gluten-free flours and/or constitute components of the gluten-free flours that may be used include, but are not limited to, bean flours, pea flours, high protein oat flours, and legume flours. In some examples, the gluten-free flour is a flour manufactured from a grain legume. The Food and Agricultural Organization of the United Nations recognizes eleven primary pulses:

1. Dry beans (*Phaseolus*) such as kidney bean, navy bean, pinto bean, haricot bean (*Phaseolus vulgaris*); lima bean, butter bean (*Phaseolus lunatus*); azuki bean (*Vigna angularis*); mung bean, golden gram, green gram (*Vigna radiata*); black gram, urad (*Vigna mungo*); scarlet runner bean (*Phaseolus coccineus*); ricebean (*Vigna umbellata*); moth bean (*Vigna aconitifolia*); and tepary bean (*Phaseolus acutifolius*),
2. Dry broad beans (*Vicia faba*) such as horse bean (*Vicia faba equina*); broad bean (*Vicia faba*); and field bean (*Vicia faba*),
3. Dry peas (*Pisum*) such as garden pea (*Pisum sativum*), protein pea (*Pisum sativum*),
4. Chickpea, garbanzo, Bengal gram (*Cicer arietinum*),
5. Dry cowpea, black-eyed pea, blackeye bean (*Vigna unguiculata*),
6. Pigeon pea, Arhar/Toor, cajan pea, Congo bean, gandules (*Cajanus cajan*),
7. Lentil (*Lens culinaris*),
8. Bambara groundnut, earth pea (*Vigna subterranea*),
9. Vetch, common vetch (*Vicia sativa*),
10. Lupins (*Lupinus*), and
11. Minor pulses such as lablab, hyacinth bean (*Lablab purpureus*); jack bean (*Canavalia ensiformis*); sword bean (*Canavalia gladiata*); winged bean (*Psophocarpus tetragonolobus*); Velvet bean, cowitch (*Mucuna pruriens*); and yam bean (*Pachyrhizus erosus*).

A flour formed from one or more of the foregoing legumes may be beneficially used as the gluten-free flour for forming the gluten-free pasta product. In one specific example, a gluten-free flour formed from yellow split peas is used to manufacture the gluten-free pasta. In another specific example, a gluten-free flour formed from chickpeas is used to manufacture the gluten-free pasta.

Depending on the desired characteristics of the pasta dough and resulting pasta product, the pasta dough can be formed using a single flour or a combination (e.g., mixture) of multiple flours. Where multiple flours are used to form the pasta dough, the combination of flours may have a combined properties falling within any of the ranges noted above as being suitable for a gluten-free flour according to the disclosure.

To form the extrudable pasta dough, the gluten-free flour or combination of gluten-free flours are blended together with water. The amount of water added to the flour can vary, e.g., depending on the type of flour used in the dough, the extrusion performance of the dough, and desired properties of the resultant product. Further, the water added to the flour can either be added by itself (e.g., as tap water, distilled water) or as part of a water-containing liquid (e.g., milk, broth).

The amount of water admixed with the gluten-free flour may be effective to partially or fully hydrate the protein and ungelatinized starch molecules in the gluten-free flour and also facilitate substantial or full dispersion of the ingredients in the dough, e.g., such that the dough is compositionally consistent. For example, the amount of water admixed with the gluten-free flour may be effective to partially or fully hydrate the protein and ungelatinized starch molecules in the gluten-free flour during subsequent mixing and/or heating during extrusion.

In some examples, the amount of water mixed with the gluten-free flour is effective to form a dough having a moisture content of at least 25 weight percent, such as at least 28 weight percent, or at least 30 weight percent. For example, the amount of water mixed with the gluten-free flour may be effective to form a dough having a moisture content ranging from 30 weight percent to 40 weight percent, such as from 32 weight percent to 38 weight percent. The moisture content of the dough may be based on the amount of liquid water mixed with the gluten-free flour prior to or during extrusion, e.g., such that any additional moisture added in the form of steam during extrusion may further increase the foregoing values. Further, the amount of moisture in the pasta dough may be measured based on the total weight of the pasta dough, including any optical additives, and may account for all sources of moisture in the dough (e.g., both added moisture and moisture present in the constituent components of the dough before combination).

In addition to incorporating flour and water, the pasta dough may contain additional optional ingredients. When additional ingredients are used, the ingredients may be added to the gluten-free pasta dough at any time during the production process, e.g., before extrusion of the pasta dough. Controlling the type, quality, and quantity of ingredients added to the pasta can control the taste, texture, and performance of the pasta, both during processing and during subsequent cooking and consumption. Example ingredients that may be added to the pasta dough include, but are not limited to, starches and protein sources. Starches from sources such as rice, corn, potato and the like may be added, e.g., in amounts from 0.25 weight percent to about 20 weight percent, such as less than 15 weight percent, based on the total weight of the gluten-free pasta dough. Protein sources that may be added to the gluten-free pasta dough may include milk protein, soy protein and eggs in any form including whole eggs, egg whites, powdered eggs, powdered egg whites and the like. When used, the protein source may be added in amounts from 0.25 weight percent to 20 weigh percent, such as less than 15 weight percent or from 0.5 weight percent to 10 weight percent, based on the total weight of the pasta dough.

A variety of natural and artificial flavors, herbs, spices, cheeses and the like also can be added to the pasta dough, if desired. In one application, salt is added to the pasta dough, for example up to 3 weight percent. The added salt may improve hydration by creating voids within the structure of the pasta after the salt dissolves during cooking. Highly soluble salts can dissolve during cooking, leaving fine trails or voids in the pasta structure that facilitates water penetration during cooking. In addition to or in lieu of salt, additional seasonings, spices, and/or flavorings such as meat or vegetable flavors may be added to the pasta dough, e.g., in amounts of from 0.1 weight percent to 3 weight percent by weight based on the total weight of the pasta dough.

Although the pasta dough can include a variety of added ingredients besides flour and water, the pasta dough may be substantially free or entirely free of some ingredients, such as ingredients that change the performance of the dough during processing and/or the final pasta product. The gluten-free pasta dough may be substantially or entirely free of added starch and/or added protein (e.g., egg) and/or free of any added texturizing ingredients with adhesion properties, such as xanthan or other hydrocolloids and/or gum additives. In some examples, the gluten-free pasta dough is formed of (e.g., consists of or consists essentially of) only two ingredients: water and gluten-free flour. In such examples, the gluten-free flour may or may not be a single ingredient flour, such as flour formed from a single type of legume. Products formed from a limited number of ingredients provide clean product labels that are increasingly desired by consumers.

After selecting a desired combination of ingredients for the gluten-free pasta dough, the ingredients can be combined together and processed to form the dough. In general, any suitable processes may be used to blend the ingredients together to form the dough. In some examples, the ingredients (or a subset thereof) are mixed together and then introduced into an extruder. For example, the ingredients may first be mixed together in a preconditioner device to provide initial hydration of the molecules in the gluten-free flour and to prepare the molecules for subsequent extrusion. A preconditioner device may be useful to provide additional mixing and/or heating to the dough ingredients, particularly when using a traditional single screw pasta extruder. Alternatively, the constituent ingredients may be separately introduced into an extruder, for example sequentially through a feed inlet or simultaneously through separate feed inlets. In either case, the ingredients may be admixed or blend together, e.g., to form a compositionally homogenous pasta dough.

Figure 2:
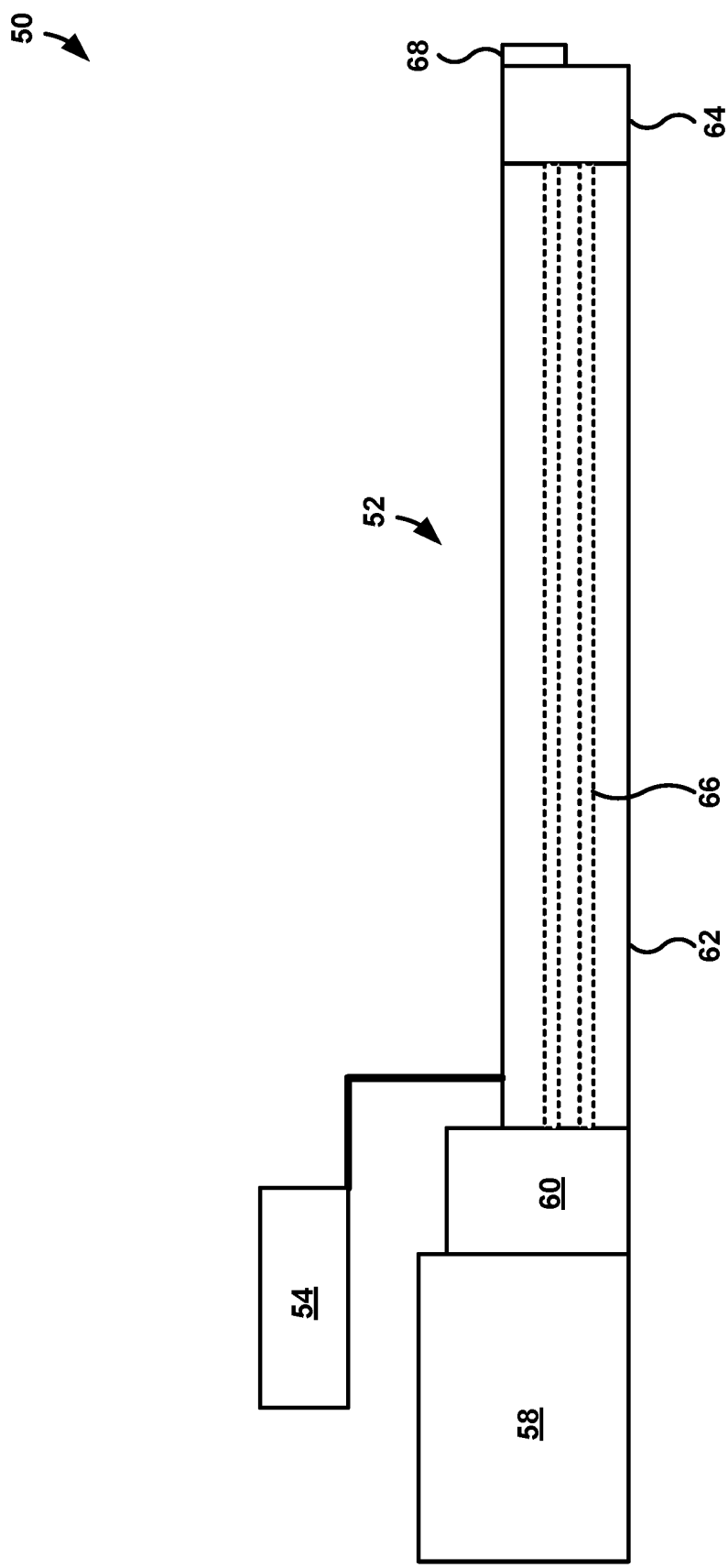
FIG. 2 is a block diagram illustrating example components of an extruder system that may be used to process a gluten-free pasta dough.

After forming the gluten-free extrudable pasta dough, the technique of FIG. 1 includes extruding the extrudable pasta dough to form an extruded pasta product. FIG. 2 is a functional block diagram illustrating example components of an extruder system 50 that may be used to process the constituent ingredients of the gluten-free pasta dough to form a gluten-free extruded pasta product. In the example of FIG. 2, extruder system 50 includes an extruder 52 and a material delivery apparatus 54. During operation, material delivery apparatus 54, which may comprise one or multiple delivery apparatuses, delivers gluten-free flour, water, and any optional ingredients to the extruder 52. Extruder 52 may receive dry and liquid ingredients, mix the ingredients together to form a dough, and extrude the dough through a die into a three dimensional shape. As noted above, in other examples, all the constituent ingredients of the pasta dough can be mixed in a preconditioner (e.g., batch or continuous mixer) to form a dough that is then fed into extruder 52. Other ingredient delivery configurations are possible.

Extruder 52 can have a variety of different mechanical configurations. In the example of FIG. 2, however, extruder 52 includes a motor 58, a gear box 60, an extruder barrel 62, an extruder die 64, and a cutter 68. Extruder barrel 62, which may be formed of multiple barrel sections, contains at least one screw (e.g., single screw extruder) which, in the illustrated example, is shown as two screws 66 (e.g., twin screw extruder). During use, motor 58 rotationally drives screws 66 to generate a forwardly directed motion in the direction of extruder die 64. Screws 66 may mix, convey, and pressurize the constituent ingredients of the pasta dough as motor 58 rotates the screws and conveys the formed dough toward the die, which provide an opening area restriction responsible for the pressure build-up. Extruder die 64 receives the pressurized and mixed ingredients forming the gluten-free pasta dough and shapes the ingredients as the ingredients pass through a discharge aperture in the die, thereby forming an extruded gluten-free pasta product. Cutter 68 is located downstream from extruder die 64 and can cut the extrudate into discrete pieces of specific size (e.g., specific length).

In different examples, extruder 52 may be implemented as a single screw extruder or twin-screw extruder. When extruder 52 is implemented as a twin screw extruder that includes two screws 66, the two screws can be positioned tangentially to one another, non-intermeshing, or intermeshing (e.g., overlapping). Further, the two screws can be operated so the screws co-rotate (i.e., so each screw rotates in the same direction) or counter-rotate (i.e., so each screw rotates in a direction opposite from the other screw).

To form an extruded pasta product that has a structure sufficient to withstand retort conditions, the amount of mechanical energy and/or thermal energy added to the extrudable pasta dough may be controlled during extrusion. For example, the amount of mechanical energy and thermal energy added to the extrudable pasta dough during extrusion may be controlled to produce an extruded pasta product defined by a bi-continuous matrix of starch and protein.

Thermal energy may be added to the extrudable pasta dough during extrusion by injecting steam into the dough during extrusion and/or hot extruding the dough (e.g., using an externally heated extruder barrel). In one example, thermal energy is added to the extrudable pasta dough by injecting steam into the dough downstream of preconditioner (if use) but upstream of any extruder mixing blocks (if used). For example, stream may be injected into the dough in the extruder at or adjacent the inlet of the extruder. The amount of steam added to the dough may be effective to partially or fully gelatinize the ungelatinized starch in the dough. In some examples, the amount of steam injected into the dough is greater than 5 weight percent of the total weight of dough fed into the extruder, such as at least 7 weight percent, or at least 10 weight percent. For example, the amount of steam injected into the dough may range from 5 weight percent to 15 weight percent of the total weight of dough fed into the extruder, such as from 10 weight percent to 14 weight percent.

In addition to or in lieu of injecting steam into the extruder, the extruder may be externally heated by externally heating extruder barrel 62, e.g., by passing a heat transfer fluids such as steam or heated fluids through a jacket of the extruder barrel. Through steam, external heating, and/or frictional heating, the pasta dough may be heated to a temperature effective to form a bi-continuous matrix of starch and protein in the resulting pasta product. In some examples, the pasta dough is heated above the glass transition temperature of the non-gluten protein contained in the dough. This can help the protein form a matrix of continuous and/or semi-continuous strands, which may be intermingled with a matrix of gelatinized protein formed through extrusion.

While the specific temperature at which the pasta dough is extruded may vary, in some applications, the dough is heated to achieve a die exit temperature greater than 65 degrees Celsius, such as a die exit temperature greater than 70 degrees Celsius, or a temperature greater than 80 degrees Celsius. For example, the pasta dough may be extruded to provide a die exit temperature ranging from 65 degrees Celsius to 70 degrees Celsius.

In addition to imparting thermal energy into the extrudable pasta dough during extrusion, mechanical energy may also be imparted into the dough during extrusion. Mechanical energy can be imparted to the dough through the screw(s) of the extruder. The amount of mechanical energy added to the pasta dough during extrusion may be effective, in combination with the thermal energy added to the dough, to form a resulting pasta product that survives retort. In some examples, the amount of mechanical energy is effective to form a bi-continuous matrix of starch and protein in the resulting pasta product. For example, the mechanical energy imparted to the dough may achieve alignment of the protein molecules to form the protein matrix portion of the resulting pasta product. In some examples, the total amount of specific mechanical energy imparted to the dough during extrusion is greater than 15 Watt-hours/kilogram (Wh/kg), such as at least 18 Wh/kg, at least 20 Wh/kg, at least 30 Wh/kg, at least 40 Wh/kg, or at least 50 Wh/kg. Specific mechanical energy may be measured as the total amount of dissipated mechanical energy introduced into the material along the entire screw length and determined based on the net mechanical energy introduced into the product divided by the sum of all solid and liquid feed streams entering the extruder. For example, specific mechanical energy can be calculated as the motor power output (% screw speed*% torque*motor power) divided by throughput.

To impart a sufficient amount of mechanical energy into the pasta dough, extruder 52 may be configured with one or more mixing screws. In contrast to an extruder conveyance screw, which is intended to convey material through the extruder without imparting significant mixing, an extruder mixing screw may include one or more forward and/or reverse kneading blocks and/or one or more reverse elements and/or other element styles to impart dispersive and distributive mixing energy to the dough being processed.

Forward staggered kneading elements can provide good distributive and dispersive mixing with very low shear input but typically have limited conveying efficiency. Reverse staggered kneading elements may be useful for good dispersive mixing in high viscous systems and for good distributive mixing in low viscous systems. Reverse pitch elements can convey material in the opposite direction, which increases the degree-of-fill in the previous section. Backward conveying may cause extensive pressure build-up and create a high shear pinch point at the junction of an upstream forward conveying element and help develop high frictional heat that causes starch gelatinization. The optimal screw design for achieving a bi-continuous protein and starch matrix may be dictated by the composition of the gluten-free flour used, the dough moisture, and other desired pasta product attributes, such as texture and geometry.

In general, the extruded pasta dough can be formed into any suitable shape on extruder 52. The pasta dough can be extruded into any short shape or long shape and may be of conventional or thin wall thickness. In general, thin wall thickness pastas provide faster cooking times for the end consumer than comparatively thicker wall pastas. Depending on the application, a thin wall thickness pasta may have a wall thickness from 0.018 inches to 0.028 inches whereas a thicker wall thickness pasta may have a wall thickness from 0.04 to 0.06 inches. A pasta according to the disclosure may survive retort yet have a wall thickness less than 0.06 in. Example pasta shapes that may be formed include bowtie, spaghetti, ziti, rigatoni, linguine, fettuccine, macaroni, lasagna, penne, tagliatella, and manicotti.

After extruding the pasta dough into an extruded pasta product (e.g., extruded pasta pieces), the technique of FIG. 1 includes drying the extruded pasta product (14). Although the freshly extruded pasta can be used immediately in the retort process, it is not always possible to use the extruded pasta right away. Accordingly, the gluten-free pasta may be preserved by common pasta preservation methods, such as drying, prior to retort. Any suitable techniques can be used to dry the extruded pasta product. Example techniques include forced air, belt drying, and fluidized bed drying techniques. As yet another example, the pasta product may be dried by freezing the product, e.g., freeze drying. Alternatively, the gluten-free pasta product may be frozen as individually quick frozen pasta (IQF gluten-free pasta) without dehydration. In some examples, the extruded pasta product is dried at a temperature less than 150 degrees Celsius, such as a temperature less than 100 degrees Celsius, a temperature less than 75 degrees Celsius, or a temperature less than 50 degrees Celsius. Drying the extruded pasta slowly at a comparatively lower temperature may help avoid checking problems that can occur if the pasta is dried faster at a higher temperature. In some examples, the extruded pasta product produced is dried so that the final (dried) extruded pasta product contains less than 15 weight percent moisture (e.g., water), such as less than 12 weight percent moisture, or less than 10 weight percent moisture.

The extruded pasta product (e.g., dried) may itself be a finished food product that can be packaged and sold for subsequent cooking and consumption. Alternatively, the extruded pasta product (e.g., dried or undried) may be utilized as an ingredient in the production of a further food product that is processed for subsequent sale and consumption. For example, as discussed above, the extruded pasta product may be utilized as a pasta ingredient in a shelf-stable retort product.

The example technique of FIG. 1 involves incorporating the extruded pasta product into a retort container, optionally with other ingredients, and closing the container to provide closed, retortable container (16). The extruded pasta product may or may not be cooked (e.g., in boiling water) prior to being introduced into the retortable container. The retortable container may be a bottle, a can, a jar, a bag, sealable tray, or other closable structure sufficient to withstand retort conditions. The retortable container can be manufactured from materials such a metal, glass, or plastic. For example, the retortable container may be a multi-layered laminated paper board container. As another example, the retortable container may be a rigid plastic tray, cup, jar, can, bowl, or other shaped container. The extruded pasta product may be incorporated into the retort container through an open end of the vessel, along with other optional ingredients, and the open end of the container subsequently closed to isolate the contents of the container from the ambient environment.

Other optional ingredients that may be included in the retort container with the extruded pasta product can vary depending on the type of retortable product being produced. In one example, the retortable pasta product is soup. One or more liquids or dissolvable extracts or concentrates may be added to the retort container with the extruded pasta product, such as a broth having a flavor of a meat, fish, herb, fruit or vegetables. Additional ingredients include protein sources (e.g., beef, pork, chicken, fish, fowl, tofu), vegetables (e.g., potatoes, carrots, beets, broccoli, corn), and seasoning (e.g., sugar, salt, pepper, garlic, sassafras, coriander, fennel, fenugreek, mustard, turmeric, cardamom, red pepper, cayenne pepper). Where the retorted pasta product is a soup, the liquid component(s) of the product may form at least 25 volume percent of the contents product, such as at least 50 volume percent, or at least 60 volume percent. As a result, the extruded pasta product may be partially or fully immersed or surrounded by the liquid in the container. A variety of retortable products other than soup, such as pasta dishes having a sauce, may be formed utilizing the extruded pasta product.

After incorporating the extruded pasta product in the retortable container with other desired ingredients and closing the container, the technique of FIG. 1 includes retorting the container to form a retorted product (18). In a typical retort process, the retort container is transported through or placed in a high pressure vessel (e.g., water bath) and then heated for a predetermined period of time. For example, the retortable container may be heated for a period of at least 5 minutes, such as at least 10 minutes, at least 15 minutes, or at least 30 minutes. The retort container and contents therein may be heated at a temperature of at least 100 degrees Celsius for that period of time, such as at least 125 degrees Celsius, or at least 130 degrees Celsius. For example, the retort container and contents therein may be heated at a temperature ranging from 125 degrees Celsius to 135 degrees Celsius. In some applications, the retort container is heated under elevated pressure. In either case, as the exterior surface of the container is heated, the enclosed contents are heated and the internal pressure within the container increases. For example, the gluten-free pasta may be retorted in a rotary style retort, which may impart high shear forces to the contents of the retort container and have a tendency to cause disintegration of soft food matter if it does not have sufficient strength and/or textual rigidity. In rotary retort, the retort container may be rotated at a velocity of at least 18 cm/sec for at least 15 minutes, resulting in a total distance of rotation of at least 250 m.

An extruded pasta product formed in accordance with present disclosure my survive retort conditions without significantly degrading or significantly losing its textual firmness. For example, the weight of an extruded pasta product measured after retort may range from 3 to 5 times the weight of the extruded pasta product as measured after drying but before retort (e.g., before being incorporated into the retort container). The additional weight following retort may be attributable to water absorbed by the pasta during retort. If the weight of the pasta following retort (and draining of surrounding liquid) is less than 3 times the weight of the dried pasta before retort, it may indicate that the pasta has disintegrated and/or lost textual firmness during retort. Thus, the change in weight of the extruded pasta product after retort as compared to before retort can be indicative of the structural integrity of the product and ability to withstand retort conditions.

The extruded pasta product may exhibit a textual firmness after retort of at least 5000 grams, such as at least 6000 grams, or at least 7000 grams. For example, the extruded pasta product may exhibit a textual firmness after retort ranging from 5000 grams to 10000 grams. Textual firmness can be measured as defined herein, with the textual firmness of a typical wheat pasta being at least 5000 grams. Thus, in these examples, a ratio of the textual firmness of an extruded pasta product according to the disclosure divided by the textual firmness of wheat pasta may be greater than 1.0, such as greater than 1.2, or greater than 1.5.

The extruded pasta product may exhibit bi-continuous matrix of protein and starch, which is believed to contribute to the ability of the pasta product to survive retort. As noted above, the term bi-continuous matrix of protein and starch means a network of protein and gelatinized starch where the gelatinized starch is at least 90% continuous and intertwined with a protein network having at least 20% dispersivity, and no more than 10 volume percent non-networked, agglomerated protein, with no single protein agglomerate having a length greater than 345 microns. In some examples, the pasta product having the bi-continuous matrix of protein and starch has gelatinized starch that is at least 95% continuous and/or a protein network having at least 30% dispersivity.

The following example may provide additional details about retortable pasta products and processing techniques in accordance with this disclosure.

Example 1—Impact of Starting Ingredients

To measure the impact of different gluten-free flour compositions on retort survivability, amino acid profiles were created for multiple different flour compositions. The flour compositions were processed into retorted pasta products using the techniques and processing conditions described herein and evaluated for quality characteristics both before and after retort.

Figure 3:
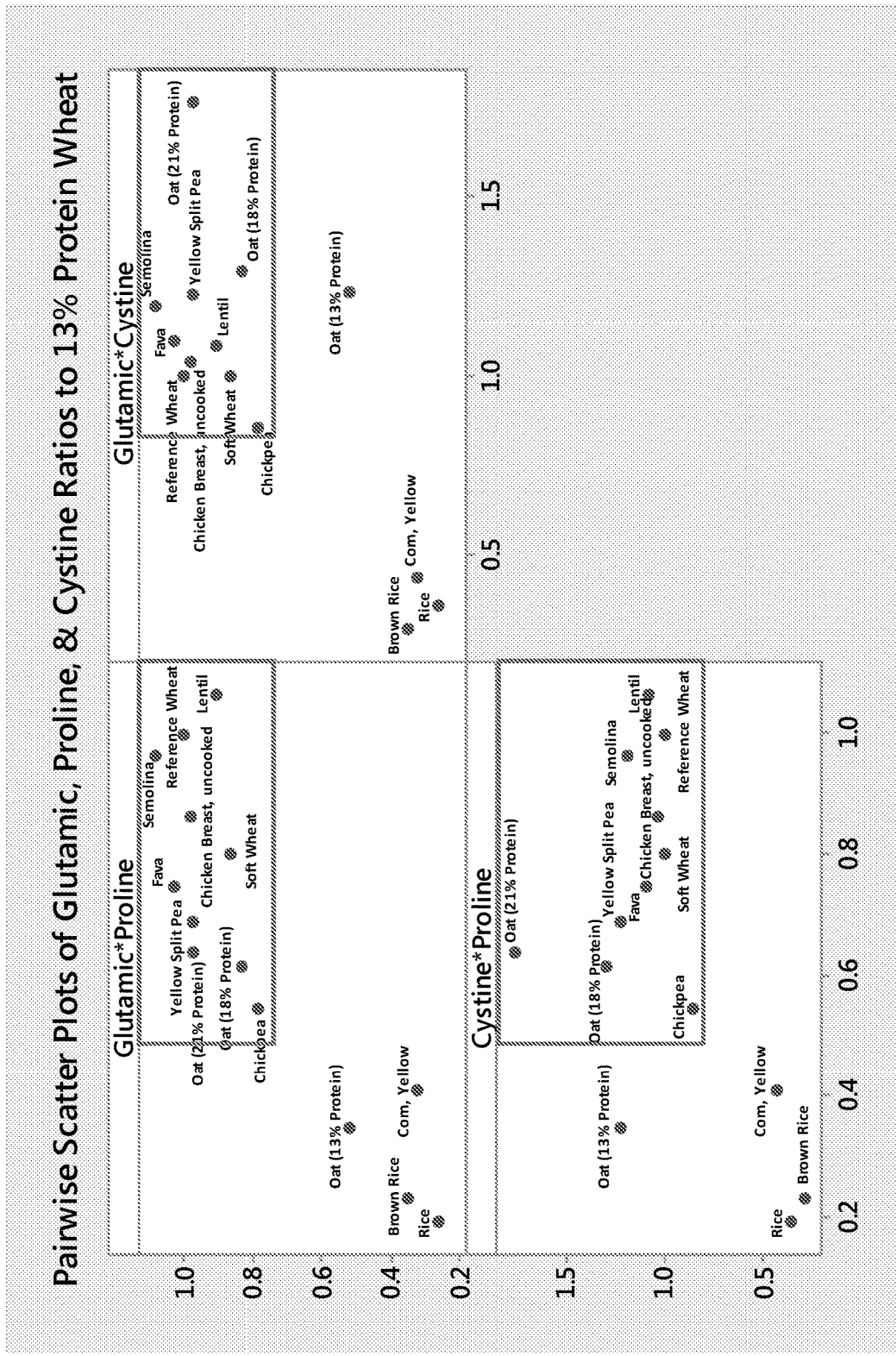
FIG. 3 is a scatter plot of glutamic acid, proline, and cystine ratios relative to corresponding amino acid levels in wheat flour.

Table 1A shows the concentrations of different amino acids for different flour compositions studied in the example along with amino acid ratios relative to a reference wheat flour. Table 1B provides data comparing the sensory quality of cooked pastas made with different starting ingredients. FIG. 3 is a scatter plot of glutamic acid, proline, and cystine ratios relative to corresponding amino acid levels in wheat flour.

TABLE 1A

Amino Acid Data

| | Reference Wheat Flour | Semolina | Chick pea | Split Pea | Lentil | Fava Bean | Oat (13% Protein) | Rice |
|---|---|---|---|---|---|---|---|---|
| % TOTAL Amino Acids (Dry Basis) | | | | | | | | |
| | 13.73 | 14.57 | 21.06 | 26.44 | 26.57 | 27.40 | 11.46 | 6.75 |
| % Individual Amino Acid (Dry Basis) | | | | | | | | |
| Tryptophan | 0.17 | 0.19 | 0.21 | 0.31 | 0.25 | 0.28 | 0.18 | 0.08 |
| Threonine | 0.37 | 0.38 | 0.81 | 0.98 | 1.01 | 1.04 | 0.39 | 0.24 |
| Isolucine | 0.50 | 0.56 | 0.94 | 1.14 | 1.22 | 1.18 | 0.45 | 0.24 |
| Leucine | 0.95 | 0.99 | 1.55 | 1.98 | 2.05 | 2.21 | 0.88 | 0.55 |
| Lysine | 0.34 | 0.28 | 1.46 | 2.00 | 1.97 | 1.88 | 0.48 | 0.23 |
| Methionine | 0.21 | 0.23 | 0.29 | 0.28 | 0.24 | 0.24 | 0.23 | 0.16 |
| Cystine | 0.34 | 0.41 | 0.29 | 0.42 | 0.37 | 0.38 | 0.42 | 0.12 |
| Phenylalanine | 0.68 | 0.71 | 1.17 | 1.28 | 1.39 | 1.24 | 0.63 | 0.36 |

TABLE 1A-continued

Amino Acid Data

| | Reference Wheat Flour | Semolina | Chick pea | Split Pea | Lentil | Fava Bean | Oat (13% Protein) | Rice |
|---|---|---|---|---|---|---|---|---|
| | % TOTAL Amino Acids (Dry Basis) | | | | | | | |
| | 13.73 | 14.57 | 21.06 | 26.44 | 26.57 | 27.40 | 11.46 | 6.75 |
| Tyrosine | 0.23 | 0.38 | 0.54 | 0.80 | 0.76 | 0.93 | 0.48 | 0.36 |
| Valine | 0.57 | 0.62 | 0.91 | 1.31 | 1.40 | 1.30 | 0.63 | 0.40 |
| Arginine | 0.49 | 0.53 | 2.06 | 2.47 | 2.18 | 2.71 | 0.85 | 0.59 |
| Histidine | 0.29 | 0.29 | 0.60 | 0.67 | 0.80 | 0.75 | 0.27 | 0.17 |
| Alanine | 0.41 | 0.43 | 0.94 | 1.22 | 1.18 | 1.20 | 0.51 | 0.38 |
| Aspartic acid | 0.55 | 0.59 | 2.57 | 3.26 | 3.13 | 3.28 | 0.95 | 0.62 |
| Glutamic acid | 4.86 | 5.24 | 3.82 | 4.73 | 4.38 | 4.99 | 2.51 | 1.24 |
| Glycine | 0.49 | 0.46 | 0.91 | 1.23 | 1.15 | 1.23 | 0.51 | 0.30 |
| Proline | 1.66 | 1.60 | 0.90 | 1.14 | 1.77 | 1.24 | 0.58 | 0.32 |
| Serine | 0.63 | 0.69 | 1.10 | 1.22 | 1.30 | 1.34 | 0.52 | 0.35 |
| Hydroxyproline | | | | | | | | |
| AA Ratio to Reference Wheat Flour | | | | | | | | |
| Tryptophan | 1.00 | 1.10 | 1.24 | 1.84 | 1.50 | 1.65 | 1.04 | 0.49 |
| Threonine | 1.00 | 1.05 | 2.21 | 2.69 | 2.77 | 2.85 | 1.06 | 0.65 |
| Isolucine | 1.00 | 1.13 | 1.89 | 2.30 | 2.46 | 2.39 | 0.91 | 0.56 |
| Leucine | 1.00 | 1.05 | 1.64 | 2.10 | 2.17 | 2.33 | 0.93 | 0.59 |
| Lysine | 1.00 | 0.82 | 4.30 | 5.88 | 5.80 | 5.53 | 1.42 | 0.69 |
| Methionine | 1.00 | 1.10 | 1.38 | 1.37 | 1.16 | 1.16 | 1.10 | 0.79 |
| Cystine | 1.00 | 1.20 | 0.85 | 1.23 | 1.08 | 1.09 | 1.23 | 0.35 |
| Phenylalanine | 1.00 | 1.03 | 1.71 | 1.86 | 2.04 | 1.81 | 0.92 | 0.53 |
| Tyrosine | 1.00 | 1.64 | 2.33 | 3.46 | 3.26 | 4.00 | 2.08 | 1.54 |
| Valine | 1.00 | 1.08 | 1.59 | 2.28 | 2.45 | 2.27 | 1.09 | 0.69 |
| Arginine | 1.00 | 1.10 | 4.22 | 5.06 | 4.48 | 5.55 | 1.75 | 1.20 |
| Histidine | 1.00 | 1.02 | 2.07 | 2.33 | 2.75 | 2.58 | 0.94 | 0.58 |
| Alanine | 1.00 | 1.04 | 2.29 | 2.98 | 2.89 | 2.94 | 1.24 | 0.92 |
| Aspartic acid | 1.00 | 1.09 | 4.71 | 5.99 | 5.74 | 6.01 | 1.74 | 1.14 |
| Glutamic acid | 1.00 | 1.08 | 0.78 | 0.97 | 0.90 | 1.02 | 0.52 | 0.26 |
| Glycine | 1.00 | 0.93 | 1.85 | 2.50 | 2.34 | 2.50 | 1.04 | 0.62 |
| Proline | 1.00 | 0.97 | 0.54 | 0.69 | 1.07 | 0.75 | 0.35 | 0.19 |
| Serine | 1.00 | 1.09 | 1.75 | 1.94 | 2.08 | 2.14 | 0.83 | 0.56 |
| Hydroxyproline | | | | | | | | |

TABLE 1B

Pasta Quality Evaluation

| Starting Ingredient(s) | % Protein Reported | Meets criteria of having: (1) glutamic acid/glutamic acid in wheat flour > 0.75; (2) cystine/cystine in wheat flour > 0.85; and (3) proline/proline in wheat flour > 0.5? | Processed with techniques according to present disclosure? | Achieved a Dough Structure having a Bi-Continuous Matrix of Protein and Starch based on Microscopy Analysis? | Pasta Format | Pasta Quality Stovetop Prep (Qualitative Sensory Evaluation) | Pasta Quality Retort Prep (Qualitative Sensory Evaluation) |
|---|---|---|---|---|---|---|---|
| Chickpea | 18 | Yes | Yes | Yes | Various Shapes Tested | Excellent | Survived: Intact shape, excellent firmness |
| Green Lentil | 19 | Yes | Yes | Yes | Rotini | Excellent | Survived: Intact shape, excellent firmness |
| Split Pea | 18 | Yes | Yes | Yes | Rotini | Excellent | Survived: Intact shape, excellent firmness |

TABLE 1B-continued

Pasta Quality Evaluation

| Starting Ingredient(s) | % Protein Reported | Meets criteria of having: (1) glutamic acid/ glutamic acid in wheat flour > 0.75; (2) cystine/ cystine in wheat flour > 0.85; and (3) proline/proline in wheat flour > 0.5? | Processed with techniques according to present disclosure? | Achieved a Dough Structure having a Bi-Continuous Matrix of Protein and Starch based on Microscopy Analysis? | Pasta Format | Pasta Quality Stovetop Prep (Qualitative Sensory Evaluation) | Pasta Quality Retort Prep (Qualitative Sensory Evaluation) |
|---|---|---|---|---|---|---|---|
| Fava Bean | 27 | Yes | Yes | Yes | Rotini | Excellent | Survived: Intact shape, excellent firmness |
| Oat—13% Protein | 13 | No | Yes | No (insufficient preferred amino acids) | Flat Noodle | Excellent | Survived but soft (insufficient preferred amino acids) |
| Comparative Examples of Commercially Available Products | | | | | | | |
| Rice (Gluten Free) | 6 | No | No | No | Flat Noodle | Excellent | Survived but soft |
| Ronzoni Gluten Free (white rice, brown rice, corn, quinoa, mono and di glycerides) | 7.14 | No | No | No | Penne | Excellent | Dissolved |
| Banza | 25 | Yes | No | No | Rotini | Acceptable | Dissolved |
| Chickpea | 25 | Yes | No | No | Elbows | Acceptable | Dissolved |
| (Chickpea, tapicoa starch, pea protein, xanthan gum) | 25 | Yes | No | No | Shells | Acceptable | Dissolved |
| | 25 | Yes | No | No | Penne | Acceptable | Mostly dissolved, very soft |
| Uddo's Kitchen Red Lentil | 25 | Yes | No | No | Penne | Acceptable | Dissolved |

As shown in Table 1B, gluten-free pasta made with all ingredients achieved acceptable to excellent quality when prepared on the stovetop by boiling the pasta in water for 5 to 12 minutes. However, when the gluten-free pastas were subjected to retort processing to reach commercial sterility, the only pastas that survived (e.g., had a significant quantity remaining as pasta post-retort) and had sufficient textual quality (e.g., comparable to conventional wheat pasta post-retort) were the samples that had been made with starting materials that met the amino acid profile criteria shown in FIG. 3 and that were produced using the techniques described herein, resulting in a bi-continuous matrix of protein and starch.

The example pasta produced using oat flour with 13 weight percent protein did not meet the proposed amino acid profile criteria due to insufficient overall protein content. It appears that lack of the required protein/amino acids made it difficult to create a bi-continuous matrix of protein and starch. Without the bi-continuous matrix of protein and starch, the pasta appeared to survive retort but did not have sufficient textual firmness to be comparable to conventional wheat pasta.

Table 2 gives a summary of some example conditions used to produce pasta made with chickpea, green lentil, split pea, fava bean, and oat with 13% protein. A range of extrusion conditions were tested and all produced similar quality results to those summarized in Table 1.

TABLE 2

| Starting Ingredient | Screw Design | Screw RPM | SME (kJ/kg) | Steam (as % of total feed) | Dough Temperature (F.) | Pasta Shape/Die |
|---|---|---|---|---|---|---|
| Chickpea | Mixing Screw Configuration | 350 | 40.8 | 14 | 175 | Penne (½" length) |

TABLE 2-continued

| Starting Ingredient | Screw Design | Screw RPM | SME (kJ/kg) | Steam (as % of total feed) | Dough Temperature (F.) | Pasta Shape/Die |
|---|---|---|---|---|---|---|
| Lentil | Mixing Screw Configuration | 190 | 40.8 | 14 | 178 | Penne (½" length) |
| Split Pea | Mixing Screw Configuration | 195 | 41.5 | 14 | 179 | Penne (½" length) |
| Fava Bean | Mixing Screw Configuration | 180 | 41.6 | 14 | 178 | Penne (½" length) |
| Oat—13% Protein | Mixing Screw Configuration | 450 | 46.7 | 12.8 | 192 | Flat |

Example 2—Impact of Extrusion Conditions

To measure the impact of different extrusion conditions on retort survivability for the resulting pasta product, a pasta dough was formed from gluten-free chickpea flour. The chickpea flour was mixed with an amount of water and processed under the conditions specified in Table 3 below. The pasta dough was extruded using a 42 mm diameter co-rotating twin-screw extruder manufactured by Buhler Inc. Samples 1 through 7 (Table 3) were produced using an extrusion screw configuration selected to provide high kneading and distributive action to create a bi-continuous dough structure. For comparative purposes, additional samples were created using an extrusion screw configuration configured to provide conveying action while imparting minimum kneading and distributive action (samples 8 to 13 in Table 4). For both sets of samples reported in Tables 3 and 4, the extruded pasta was dried after extrusion and evaluated for retort survivability as follows.

58 g of dry pasta (pasta dried to approximately 10% moisture) produced under each set of processing conditions specified in Table 3 was divided evenly between two retort containers (307×407 Can Size with EZO Lid) so each container had 29 g of dry pasta. Each can was filled with water, leaving 5/16" empty headspace from the top of the can. The cans were sealed and retorted in a rotary style retort at a reel speed of 9.7 RPM to a minimum retort temperature of 256 F and a minimum process time of 16 minutes. The cans were subsequently cooled for at least 10 min.

After cooling, the contents of both cans were combined and the pasta separated from the water using a #20 sieve. The strained pieces of pasta were visually inspected for broken pasta pieces. In addition, the stained pasta was weighed to determine the post-retort survival weight of the pasta, in grams.

Pasta samples were deemed to survive retort if the strained pasta had a post-retort weight of 180 grams or more and had less than 10 volume % broken pasta pieces. For comparison purposes, a typical wheat pasta processed under similar conditions may have a post-retort weight of 240 to 250 grams. A gluten-free pasta having a post-retort weight of 180 grams (or at least approximately 70% of the weight of a corresponding wheat pasta) can be considered to have sufficient survivability to mimic wheat flour.

TABLE 3

| | Mixing Screw Configuration | | | | | | | | |
|---|---|---|---|---|---|---|---|---|---|
| Sample Number | Water in Dough Introduced Into Extruder % | Weight Percent Steam Injected into the Extruder % | Screw Speed RPM | Steam Rate g/min | Screw Power % | Specific Mechanical Energy Added During Extrusion Wh/kg | Specific Steam Energy Added During Extrusion Wh/kg | Die Exit Temperature F. | Retort Survivability (gram) |
| 1 | 15.49 | 14.08 | 250 | 100 | 1.39 | 33 | 82.25 | 167 | Yes, 208 |
| 2 | 15.49 | 14.08 | 150 | 100 | 1.05 | 24.2 | 84.1 | 171 | Yes, 223 |
| 3 | 15.49 | 14.08 | 100 | 100 | 0.79 | 18.88 | 84.4 | 163 | Yes, 263 |
| 4 | 22.54 | 7.04 | 250 | 50 | 1.4 | 32.6 | 40.8 | 141 | No, 51 |
| 5 | 22.54 | 7.04 | 150 | 50 | 0.98 | 22.4 | 41 | 146 | No, 39 |
| 6 | 22.54 | 7.04 | 100 | 50 | 0.74 | 17.4 | 42.1 | 148 | No, 20 |
| 7 | 15.49 | 14.08 | 250 | 100 | 1.65 | 38 | 86 | 175 | Yes, 219 |

TABLE 4

Conveying Screw Configuration

| Sample Number | Water in Dough Introduced Into Extruder % | Weight Percent Steam Injected into the Extruder % | Screw Speed RPM | Steam Rate g/min | Screw Power % | Specific Mechanical Energy Added During Extrusion Wh/kg | Specific Steam Energy Added During Extrusion Wh/kg | Die Exit Temperature F. | Retort Survivability (gram) |
|---|---|---|---|---|---|---|---|---|---|
| 8 | 15.49 | 14.08 | 250 | 100 | 1.34 | 33.42 | 83.02 | 162 | Yes, 251 |
| 9 | 15.49 | 14.08 | 150 | 100 | 0.87 | 18.5 | 81.63 | 160 | Yes, 270 |
| 10 | 15.49 | 14.08 | 100 | 100 | 0.53 | 13.64 | 83.94 | 155 | No, 0 |
| 11 | 22.54 | 7.04 | 250 | 50 | 1.28 | 30.56 | 42.42 | 141 | No, 0 |
| 12 | 22.54 | 7.04 | 150 | 50 | 0.94 | 22.96 | 40.08 | 143 | No, 0 |
| 13 | 22.54 | 7.04 | 100 | 50 | 0.68 | 17.66 | 41.61 | 144 | No, 0 |

As seen from the data in Table 3 above, samples 1, 2, 3 and 7 made by a mixing screw configuration and high steam usage to take dough temperature to starch gelatinization temperature (at least 155 F dough temperature at die exit) had a high retort survivability reaching over 200 g of pasta post-retort. Samples 4, 5, 6 were made with a mixing screw configuration but due to a low steam usage, dough temperature at the die exit was below 155 F. High mixing extrusion without sufficient steam to gelatinize starch did not produce pasta that survived retort in the examples studied.

By contrast, samples 8 to 13 in Table 4 were made with a low mixing screw design with conveying elements only. In these examples where a low mixing screw design was used (conveying screw), only samples made at high and medium screw RPM (samples 8 and 9) and high steam level produced pasta that survive retort. Sample 10, made at a low screw RPM did not survive retort. Samples made by the conveying screw at low steam usage did not survive retort.

Example 3: Dough Characteristics after Extrusion

To measure the characteristics of gluten-free dough after extrusion, the dough was analyzed using a TA XT plus texture analyzer. The gluten-free dough was prepared as described in Example 2 (Tables 3 and 4). After extrusion, the extruded pasta product was preserved by storing the extruded wet dough at a temperature of 4 degree Celsius. After storing the dough at refrigerated conditions, the dough samples were brought to room temperature prior to measurement. The dough samples were subsequently mounted in a tension rig that held them in place with a screw clamps on each end. The rig was calibrated to a 5 mm gap. Each sample was clamped in place and pulled a distance of 15 mm at 2 mm/sec. Data for any samples that obviously fractured due to the clamping of the sample were eliminated and immediately retested.

Figure 4:
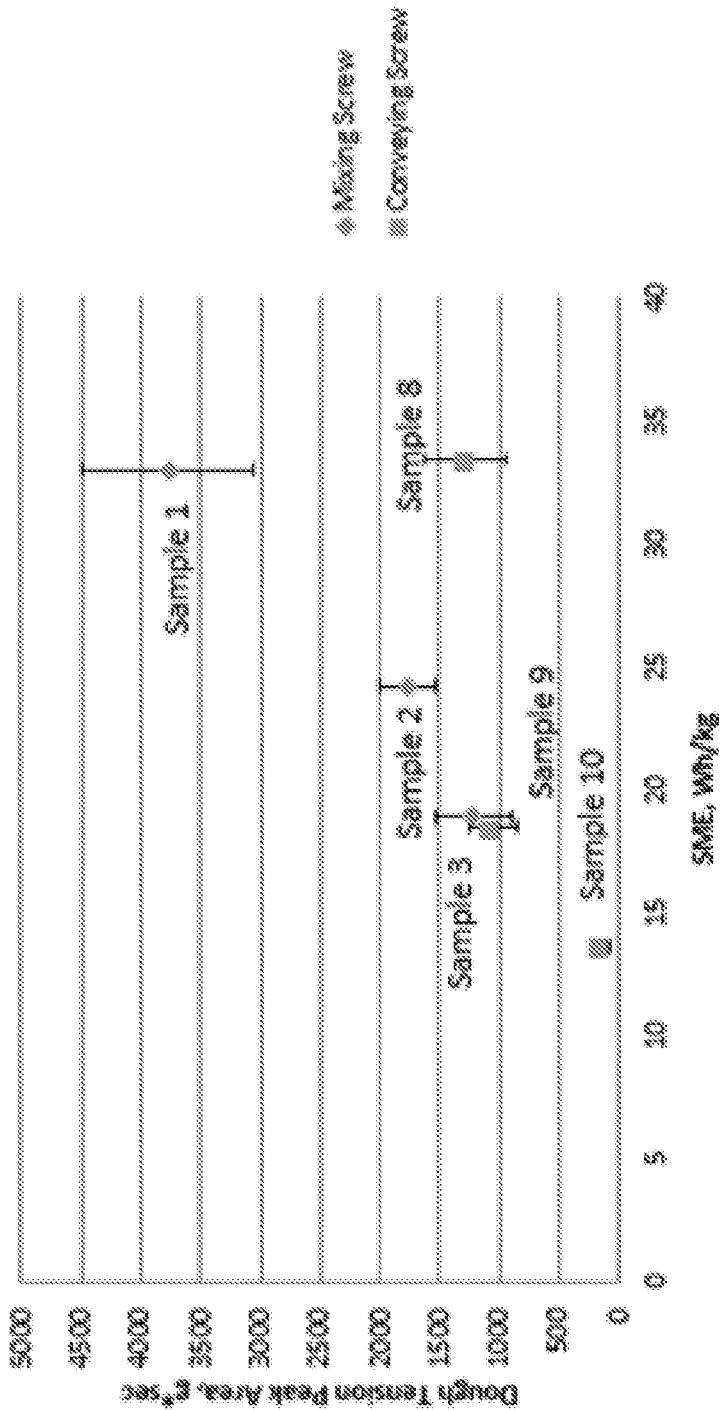
FIG. 4 is a plot showing how example dough tension measurements vary according to the amount of specific mechanical energy introduced into the dough during extrusion.

FIG. 4 is a plot showing how example dough tension measurements vary according to the amount of specific mechanical energy introduced into the dough during extrusion. In this figure, samples made by higher specific mechanical energy produced dough with stronger dough tension (Sample 1 vs. Samples 2 and 3; Sample 8 versus Samples 9 and 10). In addition, samples produced using a mixing screw as compared to a conveying screw exhibited stronger dough tension for the same specific mechanical energy input. Dough tension from samples made with comparatively lower steam levels (4, 5, 6, 11, 12 and 13) were all below 150 gram*second and have been omitted from FIG. 4 for clarity. The data showed that when insufficient steam was used to gelatinize starch, a bi-continuous matrix of protein and starch was not formed, resulting in weak dough tension. Example 5 below provides additional details on the internal structure of the dough.

Example 4: Pasta Characteristics after Retort

Figure 5:
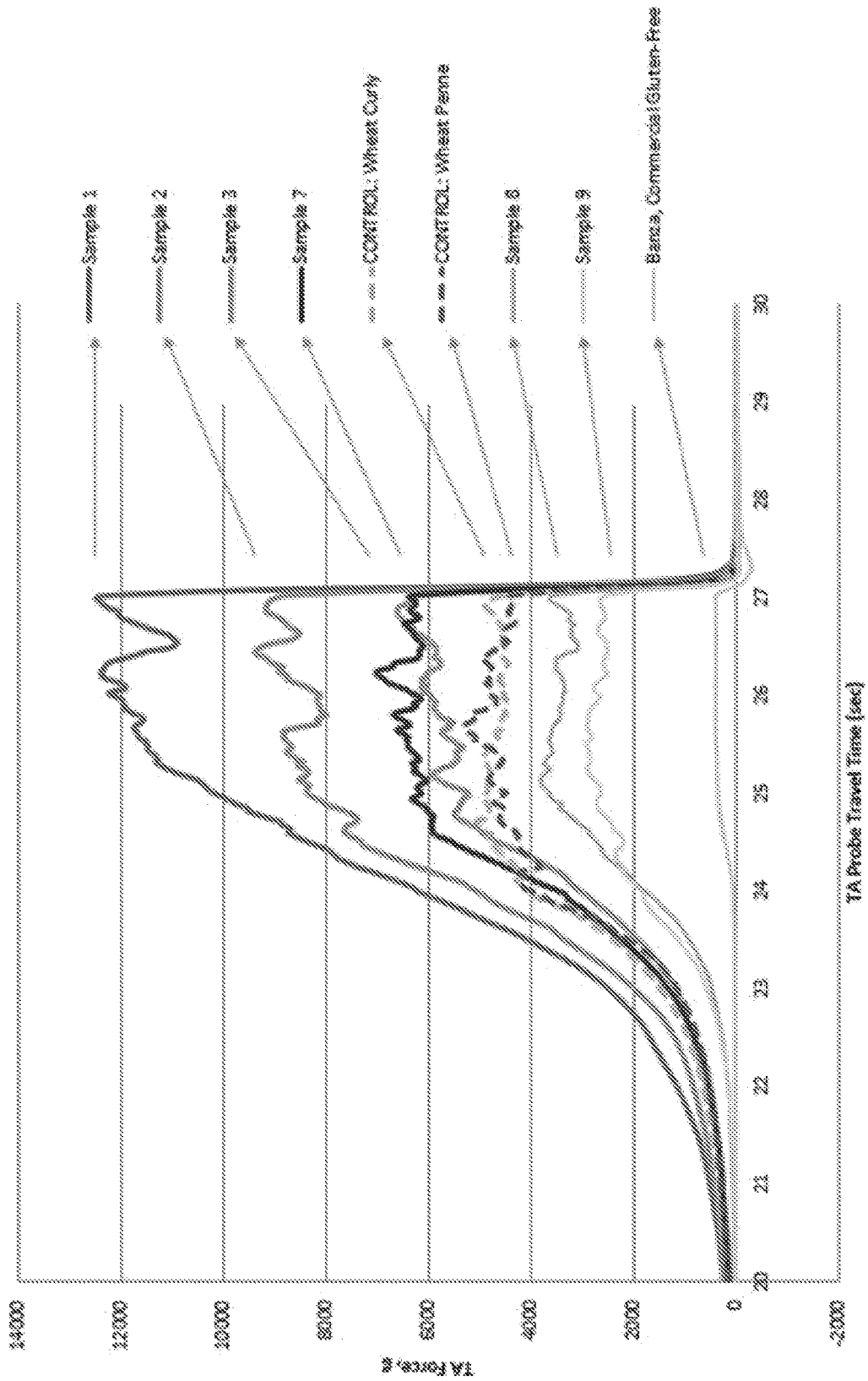
FIG. 5 is a plot showing example textual firmness values for example retorted pasta products produced in accordance with the present disclosure compared to alternative retorted pasta products not produced in accordance with the disclosure.

FIG. 5 is a plot showing example textual firmness values for example retorted pasta products produced in accordance with the present disclosure compared to alternative retorted pasta products not produced in accordance with the disclosure. Firmness was quantitatively measured using a TA.XT Plus Texture Analyzer with a TA-93WST wire Mesh Extrusion Fixture and Plunger.

To evaluate textual firmness, dry pasta samples prepared in Example 2 were retorted. Samples that survive retort (1, 2, 3, 7, 8 and 9) were strained and weighed. For comparative purposes, two wheat pasta samples (control curly shape and penne shape) and a commercially available chickpea gluten-free pasta manufactured by Banza were also retorted and analyzed for textual firmness.

To measure textual firmness, a 50 Kg load cell was attached to the TA.XT Plus Texture Analyzer and calibrated to 2000 g. The TA.XT Plus Texture Analyzer was further fitted with a TA-93WST wire Mesh Extrusion Fixture and Plunger. The plunger height was calibrated for a 135 mm test distance.

Once calibrated, 50 grams of pasta cooked via retort were loaded into the test cylinder. Texture of the sample was then measured in compression mode with a trigger distance of 135 mm, a test speed of 5 mm/second, and a contact force of 5 g. The total duration of a single test was 29 seconds. The resulting data is expressed as a curve of kg force over-time in seconds. Post-retort firmness was taken as the averaged force in kg from 25 sec to 27 seconds, when the probe cuts the food and the force is at a plateau.

As illustrated in FIG. 5, not only did Samples 1, 2, 3 and 7 survive retort (as shown by the post-retort weight in Example 2), but they also exhibited texture firmness as high as, and in most cases, higher than wheat pasta control of roughly 5000 g. While samples 8 and 9 although survived retort (as shown in Example 2 by the post-retort weight), the samples did not meet a texture firmness of 5000 g consistent with the wheat control pasta samples. Samples 8 and 9 were made with a conveying screw configuration which was not sufficient to impart dispersivity to the dough to produce a fully bi-continuous dough matrix structure.

Example 5: Structural Characteristics of Pasta Products Before and after Retort

To evaluate the structural characteristics of different extruded pasta products that did and did not survive retort conditions, light microscopy images of different pasta products were taken with 10× and 20× objectives. The microscopy was performed on both dried pasta samples that were rehydrated (but had not undergone retort) as well as retorted pasta samples. The samples were prepared and analyzed as follows:

Hydration of Dry Pasta Samples

To prepare dry pasta samples for image analysis, five representative pasta samples for each experiment were placed in a small cup and covered with deionized water. Each sample was soaked until the interior of the pasta was hydrated. The hydration time depended on the hydration properties of the pasta, which varied based on the formulation and/or processing of each specific sample.

Preparation of Hydrated Dry Pasta and Retorted Pasta

To prepare hydrated dry pasta samples as well as retorted pasta samples for image analysis, the pasta samples were placed on a metal plate and rapidly frozen with rapid flash spray. The pasta samples were then cut in half parallel to the direction of extrusion. Three half pasta samples were sandwiched together with Tissue Tek OCT Compound (4583) then fixed to a metal stub with the Tissue Tek. The sample stubs were mounted in a Leica CM1950 cryostatic microtome and cut into 18 micron sections (½ in long, 3 pasta samples wide). The sections were picked up on glass slides (VWR Superfrost Plus 48311-703). Multiple sections from each sample were retained for microscopic examination.

Starch Gelatinization

To evaluate the degree of starch gelatinization, sections of pasta samples prepared as outlined above were mounted in mineral oil and observed with slightly crossed polars to observe the birefringence of the non-gelatinized starch. The slides were imaged with an Olympus AX 70 light microscope equipped with an Olympus DP70 digital camera using a 20× objective.

Figure 6A:
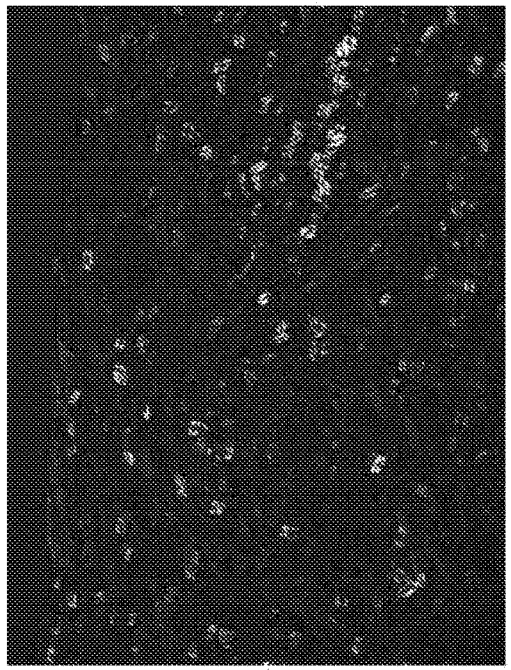
FIGS. 6A-6D are images showing example degrees of starch gelatinization for example pasta samples prepared according to the conditions described in Example 2 of the disclosure.
Figure 6B:
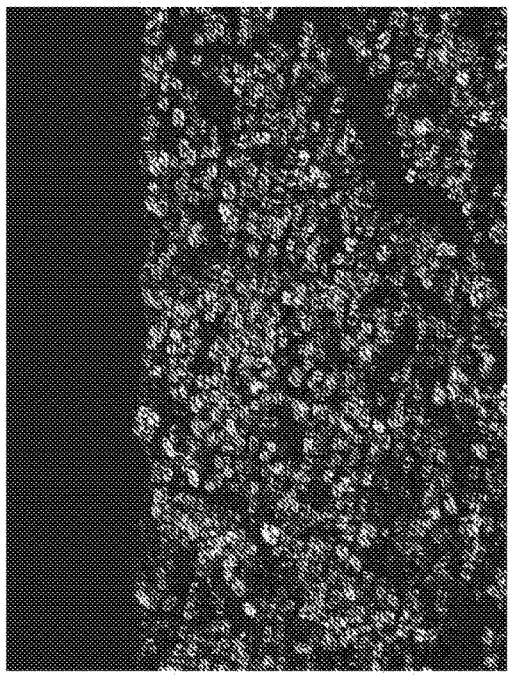
Figure 6C:
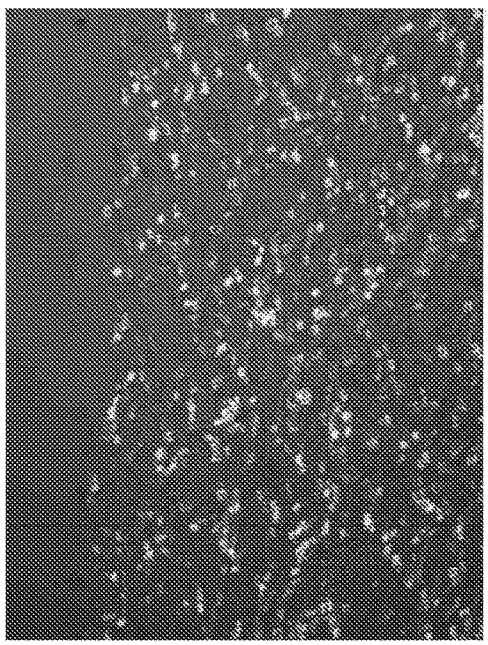
Figure 6D:
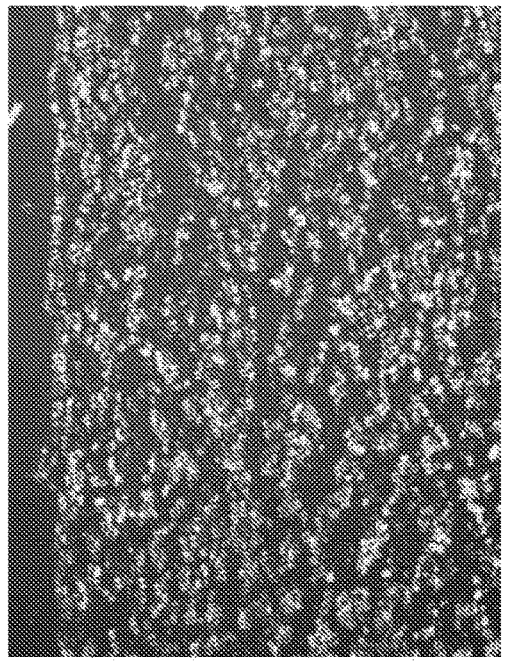

FIGS. 6A-6D are images (20× objective) showing the degree of starch gelatinization for Samples 2, 6, 9, and 12 prepared according to the conditions described in Tables 3 and 4 of Example 2. In particular, FIG. 6A illustrates the degree of starch gelatinization for Sample 9; FIG. 6B illustrates the degree of starch gelatinization for Sample 2; FIG. 6C illustrates the degree of starch gelatinization for Sample 12; and FIG. 6D illustrates the degree of starch gelatinization for Sample 6.

Birefringence of the non-gelatinized starch appears as white spots in the images. Sample 2 illustrated in FIG. 6B was made by a mixing screw at high steam level. The sample survived retort (example 2) and had high firmness post retort (example 4). The sample also showed the lowest (almost no) non-gelatinized starch. By contrast, sample 9 illustrated in FIG. 6A was made using a conveying screw (not mixing screw) at a high steam level steam. The sample had a medium amount of non-gelatinized starch. Although the sample survived retort (example 2), the textual firmness of the sample was low, below 5000 g (example 4).

Samples 6 in FIG. 6D and sample 12 in FIG. 6C were both made with a low steam level. The samples had high levels of non-gelatinized starch, as shown by the large amount of white spots in the images.

Gelatinized Starch Distribution

To evaluate the distribution of starch in different pasta samples, sections of samples 2, 3, 8, and 12 prepared according to the conditions described in Tables 3 and 4 of Example 2 were hydrated and prepared for image analysis as outlined above. The samples were stained with a 0.1N aqueous iodine solution (Alfa Aesar 35634), which was diluted 1:10 with deionized water. The starch distribution was observed using the Olympus AX 70 light microscope equipped with an Olympus DP70 digital camera and a 20× objective.

The purple color imparted by the iodine staining was thresholded to detect gelatinized starch. The area of the gelatinized starch was measured, with the number of objects detected relating to the continuous nature of the structure. Pixels exceeding the threshold value that were connected were designated as being a single object.

The degree of starch continuity was defined as the area of the largest object as a percentage of the total area of gelatinized starch identified using the protocol described here. As an example, if there was only one connected gelatinized object identified, the degree of starch continuity was 100%. If there were two objects with sizes of 80 units and 20 units, the degree of starch continuity was 80%, calculated by dividing the size of the largest object by the total object area (80/(80+20)*100=80%). The degree of starch continuity for the samples is tabulated in Table 5 below.

TABLE 5

| Sample | Area of Total Gelatinized Starch (micron^2) | Number of connected gelatinized starch object | Area of Largest Object (micron^2) | % Continuity = Area of Largest Object × 100/Area of Total Gelatinized Starch |
|---|---|---|---|---|
| Sample 2 | 550659 | 1 | 550659 | 100 |
| Sample 3 | 442145 | 1 | 442145 | 100 |
| Sample 8 | 145024 | 214 | 9400 | 6.48 |
| Sample 12 | 0 | 0 | 0 | 0 |

Figure 7C:
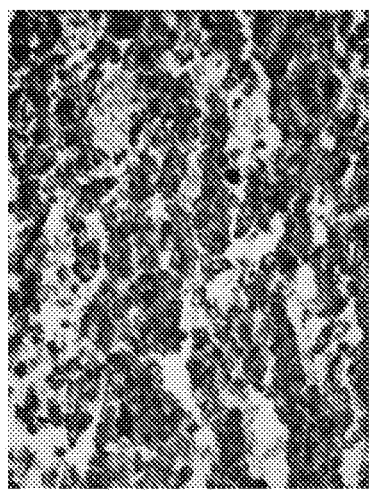
FIG. 7A-7F are images showing example distributions of starch and protein in matrices forming pasta prepared according to the conditions described in Example 2 of the disclosure.
Figure 7F:
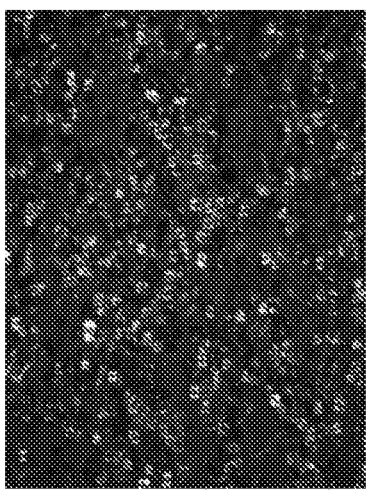
Figure 7B:
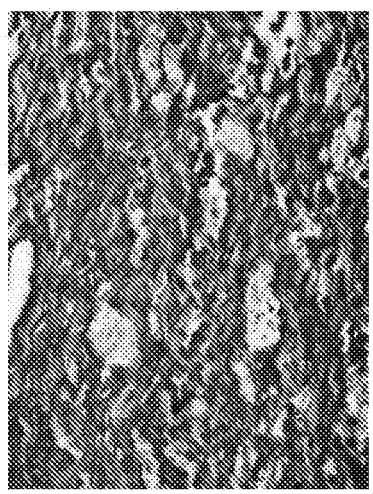
Figure 7E:
Figure 7A:
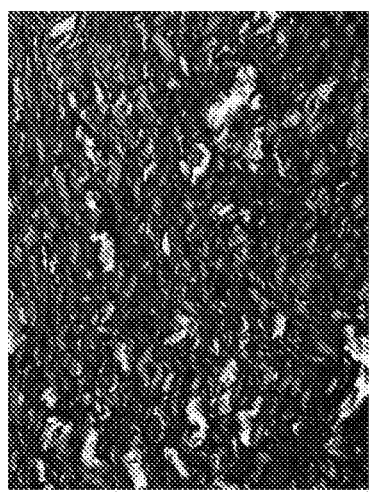
Figure 7D:

FIG. 7A-7F (20× objective) are images showing the distribution of starch and protein in the matrix forming the pasta for Samples 2, 3, 8, and 12. In particular, FIG. 7A illustrates the starch and protein distribution for Sample 2; FIG. 7B illustrates the starch and protein distribution for Sample 8; FIG. 7C illustrates the starch and protein distribution for Sample 12; and FIG. 7D illustrates the starch and protein distribution for Sample 3. The starch is illustrated in purple (for amylose starch molecules) or brownish color (for waxy or amylopectin starch molecules). The protein is illustrated in red. Non-gelatinized starch was only revealed with polarized light showing starch birefringence in the experimental apparatus.

For samples 8 and 12, due to the presence of non-gelatinized starch, polarized light for detection of birefringence of non-gelatinized starch was introduced to the images to ensure that only gelatinized starch was selected during the thresholding. FIG. 7E is an image of the starch and protein distribution for Sample 8 (FIG. 7B) overlaid with starch birefringence to show the non-gelatinized starch. FIG. 7F is an image of the starch and protein distribution for Sample 12 (FIG. 7C) overlaid with starch birefringence to show the non-gelatinized starch.

Samples 2 and 3 were created with a mixing screw and with a high level of steam. These conditions appeared to enable the production of dough matrices with a comparatively high level of continuous gelatinized starch. By contrast, samples 8 and 12 did not exhibit the same level of starch gelatinization. Samples 8 and 12 per formed using a conveying screw, not a mixing screw. Sample 8 exhibited a significantly reduced level of continuously gelatinized starch compared to samples 2 and 3. Although some pasta noodles from sample 8 retained structure after retort, the firmness of the samples was less than the 5000 g textual firmness that is comparable to wheat pasta.

For sample 12, which formed using the mixing screw and a low steam level, no gelatinized starch was observed. The iodine staining revealed only damaged starch, not gelatinized starch. Accordingly, the level of continuously gelatinized starch was zero.

Protein Distribution

To evaluate the distribution of protein in different pasta samples, sections of samples prepared according to the conditions described in Tables 3 and 4 of Example 2 were analyzed. Samples of rehydrated dry pasta as well as pasta having undergone retort were analyzed as shown in Table 6, along with a commercially available Banza product not produced according to the techniques of the disclosure.

Prepared cryo-sections from each sample were stained with 0.01% Ponceau2R (C.I. 16150) for 1 minute. The slides were then cleared with deionized water. The protein distribution was observed with an Olympus AX 70 Light microscope using a 20× objective. Representative fields were imaged with an Olympus DP70 digital camera.

Figure 8:
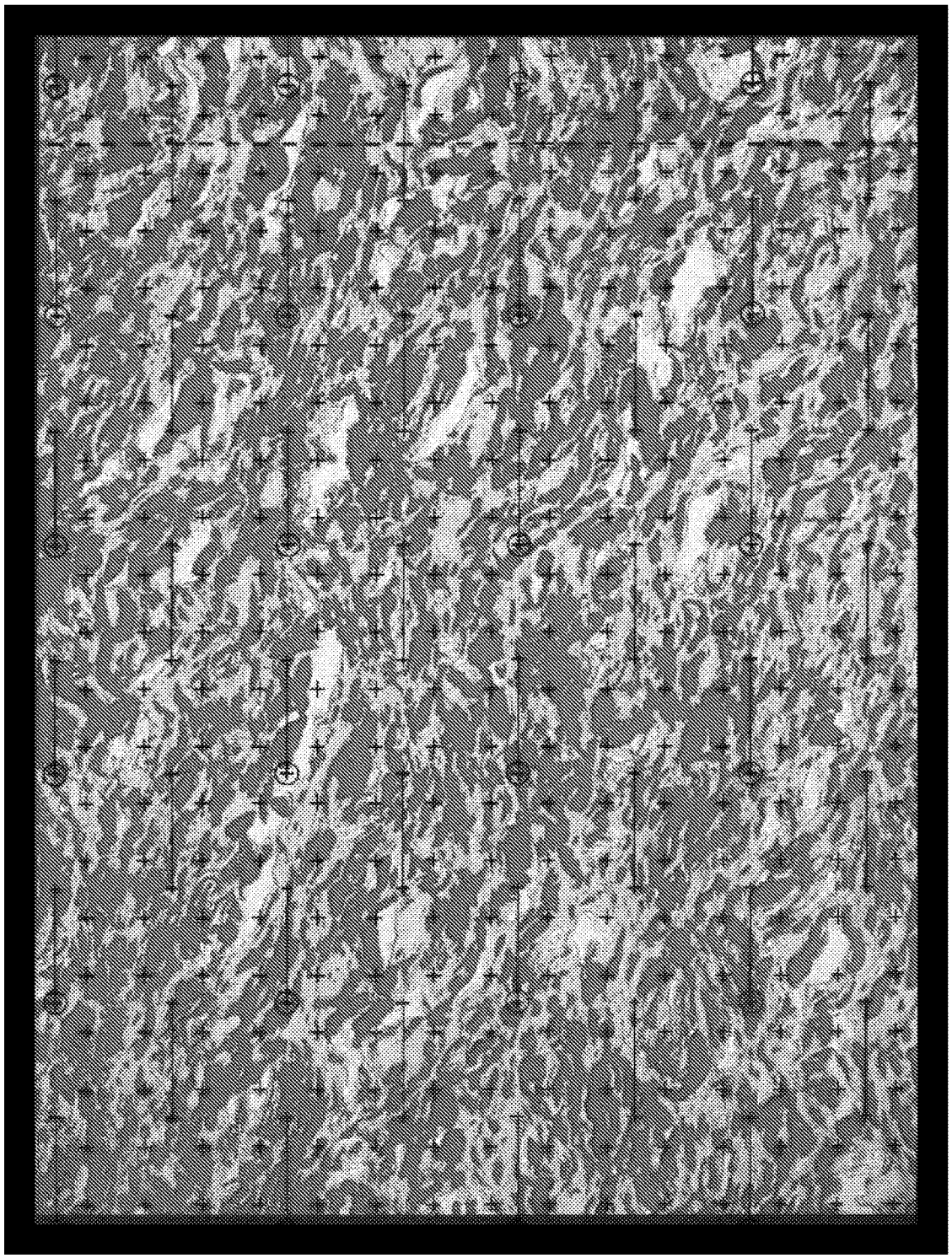
FIG. 8 illustrates an example stereology grid overlaying an example pasta sample.

To detect protein in the samples, the red color imparted by the Ponceau 2R stain was thresholded. A 21×15 stereology grid at spacing of 40 microns between grid points was overlaid on the images. The width of the crosshairs was 1.23 microns, resulting in a crosshair intersection of 1.5 square microns overlaying the images. The stereology grid was overlaid on images taken at 20× magnification, providing 0.64 microns per pixel, to detect how the grid points intercepted with the protein. FIG. 8 (20× objective) illustrates the stereology grid overlaying an example pasta sample, specifically Sample 1 from Example 2 discussed above.

Protein dispersivity was measured by comparing the number of points—specifically the location where orthogonal crosshairs intersected in the example of FIG. 8—overlaying stained protein with the total number of crosshair points overlaid on the image under analysis. Thus, % dispersivity was measured by dividing the number of positive or intersecting intercepts by the/#total intercepts possible. Table 6 below shows the results of the analysis.

TABLE 6

| Sample | # of Positive Intercepts (out of 315 total intercepts) | % Protein Dispersivity | Survivability > 180 g? | Firmness > 5000 g? |
|---|---|---|---|---|
| Retorted Pasta Analysis | | | | |
| Sample 1 | 169 | 53.65 | Yes | Yes |
| Sample 2 | 122 | 38.73 | Yes | Yes |
| Sample 3 | 78 | 24.76 | Yes | Yes |
| Sample 3 (repeat) | 97 | 30.79 | Yes | Yes |
| Sample 5 | 114 | 36.19 | No | No |
| Sample 4 | 113 | 35.87 | No | No |
| Sample 4 (repeat) | 109 | 34.60 | No | No |
| Sample 8 | 52 | 16.51 | Yes | No |
| Sample 8 (repeat) | 68 | 21.59 | Yes | No |
| Sample 8 (repeat) | 71 | 22.54 | Yes | No |
| Sample 8 (repeat) | 86 | 27.30 | Yes | No |
| Sample 9 | 43 | 13.65 | Yes | No |
| Sample 9 (repeat) | 47 | 14.92 | Yes | No |
| Sample 9 (repeat) | 76 | 24.13 | Yes | No |
| Sample 9 (repeat) | 59 | 18.73 | Yes | No |
| Banza | 18 | 5.71 | No | No |
| Banza (repeat) | 19 | 6.03 | No | No |
| Banza (repeat) | 34 | 10.79 | No | No |
| Banza (repeat) | 16 | 5.08 | No | No |

TABLE 6-continued

| Sample | # of Positive Intercepts (out of 315 total intercepts) | % Protein Dispersivity | Survivability > 180 g? | Firmness > 5000 g? |
|---|---|---|---|---|
| Dry Pasta Analysis | | | | |
| Sample 7 | 118 | 33.52 | Yes | Yes |
| Sample 1 | 111.5 | 35.40 | Yes | Yes |
| Sample 2 | 95 | 30.16 | Yes | Yes |
| Sample 3 | 79 | 25.08 | Yes | Yes |
| Sample 6 | 141 | 44.76 | No | No |
| Sample 5 | 102 | 32.38 | No | No |
| Sample 4 | 137.5 | 43.65 | No | No |
| Sample 8 | 79 | 25.08 | Yes | No |
| Sample 9 | 92.5 | 29.37 | Yes | No |
| Sample 10 | 74.5 | 23.65 | No | No |
| Sample 11 | 76.5 | 24.29 | No | No |
| Sample 12 | 66.5 | 21.11 | No | No |
| Ronzoni | 35 | 11.22 | No | No |
| Banza | 18 | 5.71 | No | No |
| Banza (repeat) | 19 | 6.03 | No | No |
| Banza (repeat) | 34 | 10.79 | No | No |
| Banza (repeat) | 16 | 5.08 | No | No |

The data show that pasta that survived retort and had high post-retort firmness generally had a protein dispersivity of at least 20%, such at least 24%, at least 25%, or at least 30%. Samples that exhibited high protein dispersivity but also had a high level of non-gelatinized starch in the matrix (such as samples 4, 5, 6, 11, 12 and 13) did not survive retort and/or did not produce pasta with a textual firmness over 5000 g. Thus, the combination of a comparatively high level of protein dispersivity along with a comparatively low level of non-gelatinized starch appeared to help retort survivability while providing sufficient textual firmness.

Continuous Edge

During image analysis, it was observed that pasta made according to the techniques of the present disclosure exhibited a retaining edge, not present on competitive samples, which appeared to help contribute to the survivability of the pasta to retort conditions. To analyze the edge, pasta samples prepared according to the conditions of sample 3 described in Table 3 of Example 2 were analyzed along with pasta samples not prepared according to the techniques of the present disclosure. Sections from each sample were stained with a 0.1N aqueous iodine solution (Alfa Aesar 35634) which was diluted 1:10 with deionized water.

Figure 9C:
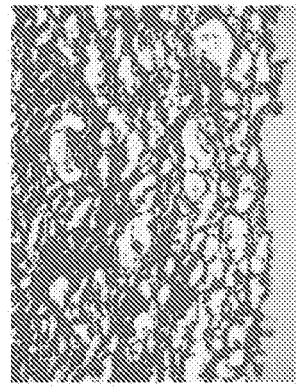
Figure 9F:
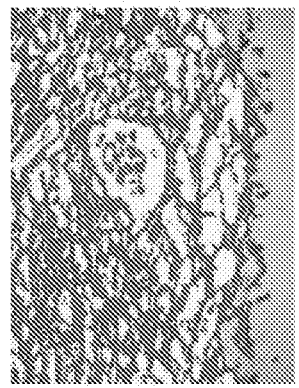
Figure 9B:
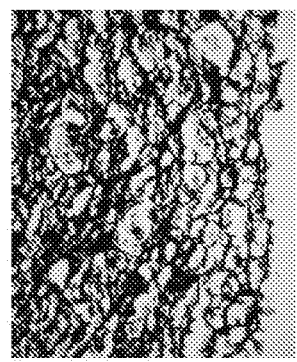
Figure 9E:
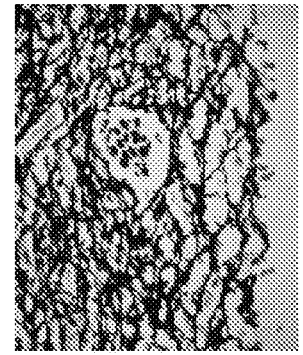
Figure 9A:
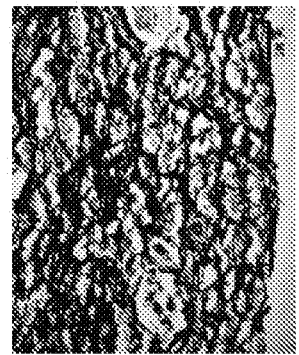
Figure 9D:
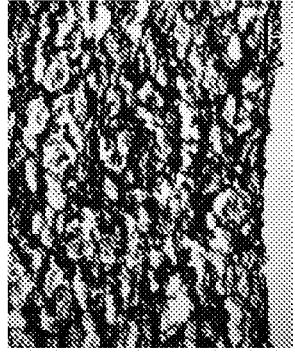

FIGS. 9A-9L (10× objective) are images of different pasta samples analyzed for edge continuity. FIG. 9A shows the edge of dry pasta sample for sample 3. FIG. 9B shows the edge of pasta sample 3 following retort. FIG. 9C is the same sample image as FIG. 9B highlighting void sections within the pasta to show the increased surface area exposed to broth after retort. FIG. 9D shows the edge of the dry pasta sample for sample 3 (repeated image analysis). FIG. 9E shows the edge of pasta sample 3 following retort (repeated image analysis). FIG. 9F is the same sample image as FIG. 9E highlighting void sections within the pasta to show the increased surface area exposed to broth after retort.

FIG. 9G shows the edge of a dry pasta sample not produced according to the present disclosure. FIG. 9H shows the edge of the pasta sample of FIG. 9G following retort. FIG. 9I is the same sample image as FIG. 9H highlighting void sections within the pasta to show the increased surface area exposed to broth after retort. FIG. 9J shows the edge of the dry pasta sample not produced according to the present disclosure (repeated image analysis). FIG. 9K shows the edge of pasta sample of FIG. 9J following retort (repeated image analysis). FIG. 9L is the same sample image as FIG. 9J highlighting void sections within the pasta to show the increased surface area exposed to broth after retort.

Without wishing to be bound by any particular theory, it is believed that conventional gluten-free pasta currently available commercially (either prepared on stovetop or retorted) shows significant starch sloughing. Starch sloughing refers to the loss of starch into a liquid medium (e.g., broth) during cooking. A high degree of starch sloughing will result in loss of pasta weight and an insufficient pasta weigh following retort.

The images shown in FIGS. 9A-9L show that the pasta sample not produced in accordance with the present disclosure had a significantly longer edge length exposed to broth and area exposed to broth post-retort than the pasta sample produced according to the disclosure. Long edge lengths were detected from pasta not produced in accordance with the present disclosure as these pasta samples had a highly tortuous surface morphology due to the presence of many break points at the boundary, providing opportunities for starch and protein to "leach" from the internal pasta matrix into the broth during retort, causing loss in weight and firmness. In contrast, pasta made according to the present disclosure exhibited a tight (and shorter) edge in dry form, and with less expanded edge length post-retort. This retaining edge appeared to minimize the area of the pasta exposed to broth post-retort.

To quantify the characteristics of the edges of the different samples studied, the starch matrix of the samples was thresholded as discussed above in connection with analysis of the gelatinized starch distribution. The voids in the pasta were also thresholded. Deleting the voids external to the pasta revealed the pathways were broth can penetrate into the pasta and enable sloughing or loss of pasta material into the broth in retort.

Table 7 reports the void length along the edge of the different pasta samples measured. Table 8 reports the areas of different segments in the images that were measured (in microns$^2$) and the area exposed to broth.

TABLE 7

|  | Dry Pasta Hydrated for Analysis | Retorted Pasta | | |
| --- | --- | --- | --- | --- |
|  | Edge Length Exposed to Broth (micron) | Edge Length Exposed to Broth (micron) | # of Breaks | Area Exposed to Broth (microns$^2$) |
| Sample 3 | 2502 | 2810 | 0 | 0 |
| Sample 3 (repeat) | 2187 | 4743 | 3 | 8.3 |
| Not according to the present disclosure | 5982 | 7617 | 3 | 29.1 |
| Not according to the present disclosure (repeat) | 2798 | 15469 | 7 | 28.9 |

TABLE 8

Area of Matrix after Sloughing in Retort (microns$^2$)

|  | Starch | Broth + Voids | Broth Area in Image | Voids | Voids exposed | Remaining Voids (Voids exposed/ Voids* 100) | Area of Exposed Voids (100- Remaining Voids) |
| --- | --- | --- | --- | --- | --- | --- | --- |
| Sample 3 | No Sloughing in this sample | | | | 0 | 100 | 0 |
| Sample 3 (repeat) | 984816 | 1313397 | 354170 | 959227 | 879893 | 91.73 | 8.27 |
| Not according to the present disclosure | 1508978 | 1374110 | 221496 | 1152614 | 816853 | 70.87 | 29.13 |
| Not according to the present disclosure (repeat) | 1555902 | 1241877 | 240874 | 1001003 | 712212 | 71.15 | 28.85 |

Based on the analysis, the pasta samples made according to the present disclosure exhibited less than 2% porosity along the overall length of the edge, and no individual holes or pores exceeding 27 microns in size.

The invention claimed is:

1. A process for preparing a retorted product comprising:
preparing a dough mixture by admixing a gluten-free flour with water to form an extrudable pasta dough;
extruding the extrudable pasta dough at a temperature and with an amount of mechanical energy effective to form an extruded pasta product having a bi-continuous matrix of protein and starch, wherein extruding the extrudable pasta dough comprises heating the extrudable pasta dough to an extruder die exit temperature ranging from 70 degrees Celsius to 85 degrees Celsius, injecting an amount of steam into the extrudable pasta dough that is greater than 5 weight percent of a weight of the extrudable pasta dough, and imparting at least 18 Wh/kg of specific mechanical energy into the extrudable pasta dough;
incorporating the extruded pasta product into a closed container; and
retorting the extruded pasta product in the closed container, thereby producing a product containing retorted pasta.

2. The process of claim 1, wherein the extruded pasta product is bounded by a wall of starch formed about an external perimeter of the extruded pasta product.

3. The process of claim 2, wherein the wall of starch has a substantially closed boundary.

4. The process of claim 1, wherein retorting the extruded pasta product in the closed container comprises heating the extruded pasta product in the closed container at a temperature greater than or equal to 125 degrees Celsius for a period of at least 10 minutes.

5. The process of claim 1, wherein the retorted pasta product exhibits a textural firmness of at least 5000 grams.

6. The process of claim 1, further comprising drying the extruded pasta, wherein the extruded pasta has a weight after drying, the retorted pasta has a weight, and the weight of the retorted pasta is at least 3 times greater than the weight of the extruded pasta after drying.

7. The process of claim 1, wherein the product containing retorted pasta is a soup or a pasta meal with sauce.

8. The process of claim 1, wherein the gluten-free flour is a legume flour.

9. The process of claim 1, wherein the gluten-free flour comprises glutamic acid, cystine, and proline.

10. The process of claim 9, wherein a ratio of glutamic acid in the gluten-free flour to an amount of glutamic acid in a wheat flour is greater than 0.75, a ratio of cystine in the gluten-free flour to an amount of cystine in the wheat flour is greater than 0.85, and a ratio of proline in the gluten-free flour to an amount of proline in the wheat flour is greater than 0.5.

11. The process of claim 1, wherein the gluten free flour contains protein and starch, the protein forms at least 18 weight percent of the gluten free flour, and the starch comprises at least 50 weight percent ungelatinized starch.

12. The process of claim 1, wherein extruding the extrudable pasta dough comprises imparting at least 20 Wh/kg of specific mechanical energy into the extrudable pasta dough.

13. The process of claim 1, wherein extruding the extrudable pasta dough comprises imparting from 30 Wh/kg of specific mechanical energy into the extrudable pasta dough to 40 Wh/kg of specific mechanical energy into the extrudable pasta dough.

14. The process of claim 1, wherein the amount of steam is greater than 7 weight percent of the weight of the extrudable pasta dough.

15. The process of claim 1, wherein the amount of steam ranges from 10 weight percent to 14 weight percent of the weight of the extrudable pasta dough.

16. The process of claim 1, wherein the extruded pasta product has a wall thickness less than 0.06 inches.

17. The process of claim 1, further comprising drying the extruded pasta, wherein drying the extruded pasta comprises drying at a temperature less than 75 degrees Celsius.

* * * * *